United States Patent [19]

Yoshida

[11] Patent Number: 5,317,411
[45] Date of Patent: May 31, 1994

[54] IMAGE ENCODING

[75] Inventor: Tadashi Yoshida, Ichikawa, Japan

[73] Assignee: Canon Kabushiki Kaisha, Tokyo, Japan

[21] Appl. No.: 913,040

[22] Filed: Jul. 14, 1992

[30] Foreign Application Priority Data

Jul. 15, 1991 [JP] Japan .................. 3-173956
Nov. 22, 1991 [JP] Japan .................. 3-307804

[51] Int. Cl.$^5$ .................................. H04N 1/41
[52] U.S. Cl. ........................... 358/261.2; 358/430
[58] Field of Search ............... 358/75, 400, 401, 403, 358/405, 261.2, 430, 443, 445, 468

[56] References Cited

U.S. PATENT DOCUMENTS

| | | |
|---|---|---|
| 4,688,100 | 8/1987 | Haganuma et al. |
| 4,868,643 | 9/1989 | Taguchi .................. 358/78 |
| 5,072,291 | 12/1991 | Sekizawa .................. 358/75 |

FOREIGN PATENT DOCUMENTS 0395394 2/1990 European Pat. Off.
0416833 3/1991 European Pat. Off.

OTHER PUBLICATIONS

IBM Tech. Discl. Bull. vol. 1, Jun. 1985, pp. 34–41, Takahashi et al., "Data Compression Coding Of Gray-Scale Images Using Bit Planes".
IBM Tech. Discl. Bull. vol. 24, No. 9, Feb. 1982, pp. 4513–4516, Anastassiou "High Performance Exact Gray-Scale Compression Technique".
IEEE Trans. Comm., vol. COM-29, No. 6, Jun. 1981, pp. 858–, Langdon, Jr. et al., "Compression of Black–White Images with Arithmetic Coding".

*Primary Examiner*—Bentsu Ro
*Attorney, Agent, or Firm*—Fitzpatrick, Cella, Harper & Scinto

[57] ABSTRACT

Image encoding apparatus can operate in a plane sequential encoding mode and in a dot sequential encoding mode. Furthermore, the apparatus may automatically selects any one of these encoding modes or the modes may be selected manually.

30 Claims, 22 Drawing Sheets

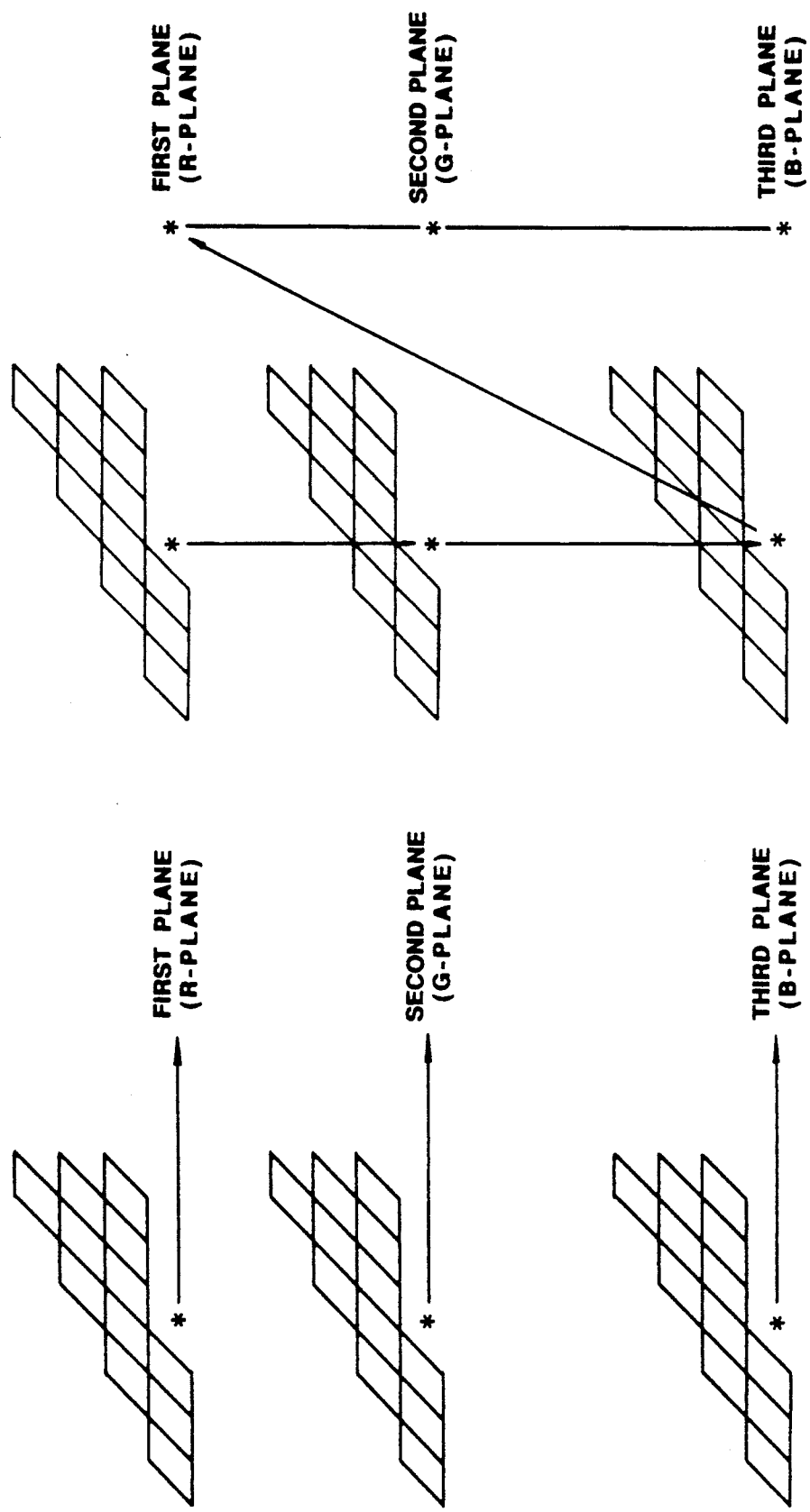
FIG. 3(b) DOT SEQUENTIAL ENCODING
FIG. 3(a) PLANE SEQUENTIAL ENCODING

FIG. 4
FIRST PLANE
(R-PLANE)
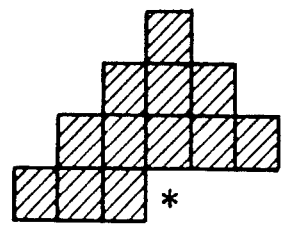
SECOND PLANE
(G-PLANE)
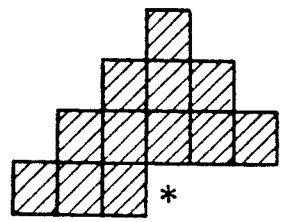
THIRD PLANE
(B-PLANE)
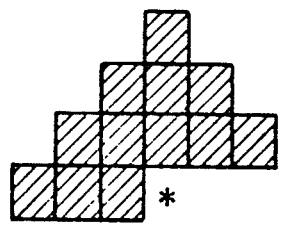

FIG.13

| I | MC |
|---|---|
| 1 | 2 |
| 2 | 1 |
| 3 | 1 |
| 4 | 1 |
| 5 | 2 |
| 6 | 4 |
| 7 | 5 |
| 8 | 8 |
| 9 | 11 |
| 10 | 15 |
| 11 | 22 |
| 12 | 30 |
| 13 | 43 |
| 14 | 61 |
| 15 | 87 |
| 16 | 120 |
| 17 | 174 |
| 18 | 241 |
| 19 | 348 |
| 20 | 483 |

| X | MPS | YN |
|---|-----|-----|
| 0 | 0 | 0 |
| 0 | 1 | 1 |
| 1 | 0 | 1 |
| 1 | 1 | 0 |

FIG.15

| I | UPA=UPB=0 | d=1 | | | d=2 | | |
|---|---|---|---|---|---|---|---|
| | | UPA=1 | UPB=1 | | UPA=1 | UPB=1 | |
| | I' | I' | I' | EX | I' | I' | EX |
| 1 | 1 | 2 | 1 | 1 | 3 | 1 | 1 |
| 2 | 2 | 3 | 1 | 0 | — | — | — |
| 3 | 3 | 4 | 2 | 0 | 5 | 1 | 0 |
| 4 | 4 | 5 | 3 | 0 | — | — | — |
| 5 | 5 | 6 | 4 | 0 | 7 | 3 | 0 |
| 6 | 6 | 7 | 5 | 0 | — | — | — |
| 7 | 7 | 8 | 6 | 0 | 9 | 5 | 0 |
| 8 | 8 | 9 | 7 | 0 | — | — | — |
| 9 | 9 | 10 | 8 | 0 | 11 | 7 | 0 |
| 10 | 10 | 11 | 9 | 0 | — | — | — |
| 11 | 11 | 12 | 10 | 0 | 13 | 9 | 0 |
| 12 | 12 | 13 | 11 | 0 | — | — | — |
| 13 | 13 | 14 | 12 | 0 | 15 | 11 | 0 |
| 14 | 14 | 15 | 13 | 0 | — | — | — |
| 15 | 15 | 16 | 14 | 0 | 17 | 13 | 0 |
| 16 | 16 | 17 | 15 | 0 | — | — | — |
| 17 | 17 | 18 | 16 | 0 | 19 | 15 | 0 |
| 18 | 18 | 19 | 17 | 0 | — | — | — |
| 19 | 19 | 20 | 18 | 0 | 21 | 17 | 0 |
| 20 | 20 | 21 | 19 | 0 | — | — | — |
| 21 | 21 | 21 | 20 | 0 | 21 | 19 | 0 |

(—) DON'T CARE.

FIG.16

| I | EFFECTIVE PROBABILITY $q_0$ | COEFFICIENT | | ENCODING PARAMETER | | |
|---|---|---|---|---|---|---|
| | | $q_1$ | $q_2$ | $Q_1$ | $Q_2$ | $Q_3$ |
| 1 | 0.5000 | $2^{-2}$ | $2^{-2}$ | 2 | 2 | + |
| 2 | 0.4375 | $2^{-1}$ | $-2^{-4}$ | -1 | 4 | - |
| 3 | 0.3750 | $2^{-2}$ | $2^{-3}$ | 2 | 3 | + |
| 4 | 0.3125 | $2^{-2}$ | $2^{-4}$ | 2 | 4 | + |
| 5 | 0.2500 | $2^{-3}$ | $2^{-3}$ | 3 | 3 | + |
| 6 | 0.1875 | $2^{-3}$ | $2^{-4}$ | 3 | 4 | + |
| 7 | 0.1250 | $2^{-4}$ | $2^{-4}$ | 4 | 4 | + |
| 8 | 0.0938 | $2^{-4}$ | $2^{-5}$ | 4 | 5 | + |
| 9 | 0.0625 | $2^{-5}$ | $2^{-5}$ | 5 | 5 | + |
| 10 | 0.0469 | $2^{-5}$ | $2^{-6}$ | 5 | 6 | + |
| 11 | 0.0313 | $2^{-6}$ | $2^{-6}$ | 6 | 6 | + |
| 12 | 0.0234 | $2^{-6}$ | $2^{-7}$ | 6 | 7 | + |
| 13 | 0.0156 | $2^{-7}$ | $2^{-7}$ | 7 | 7 | + |
| 14 | 0.0117 | $2^{-7}$ | $2^{-8}$ | 7 | 8 | + |
| 15 | 0.0078 | $2^{-8}$ | $2^{-8}$ | 8 | 8 | + |
| 16 | 0.0059 | $2^{-8}$ | $2^{-9}$ | 8 | 9 | + |
| 17 | 0.0039 | $2^{-9}$ | $2^{-9}$ | 9 | 9 | + |
| 18 | 0.0029 | $2^{-9}$ | $2^{-10}$ | 9 | 10 | + |
| 19 | 0.0020 | $2^{-10}$ | $2^{-10}$ | 10 | 10 | + |
| 20 | 0.0015 | $2^{-10}$ | $2^{-11}$ | 10 | 11 | + |
| 21 | 0.0010 | $2^{-11}$ | $2^{-11}$ | 11 | 11 | + |

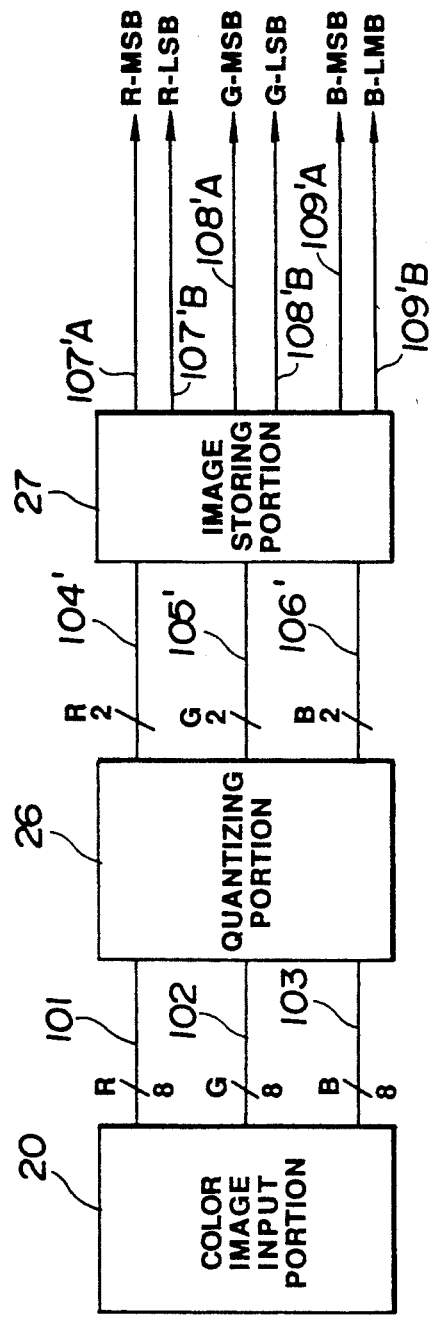

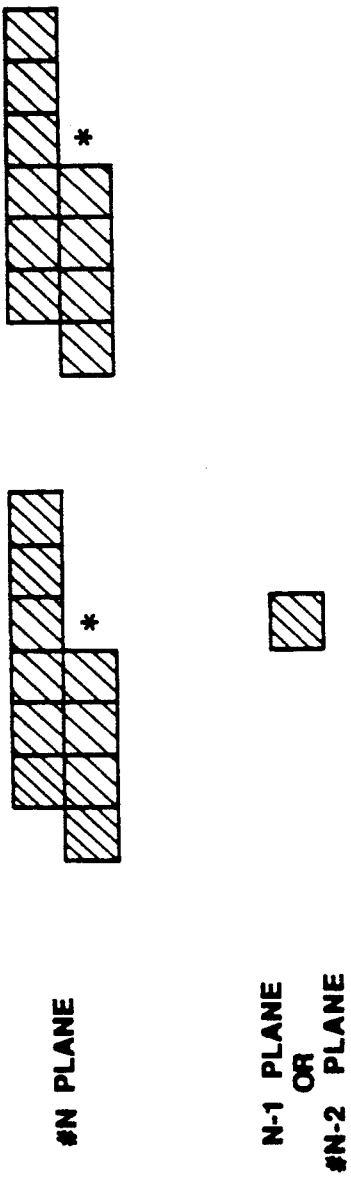

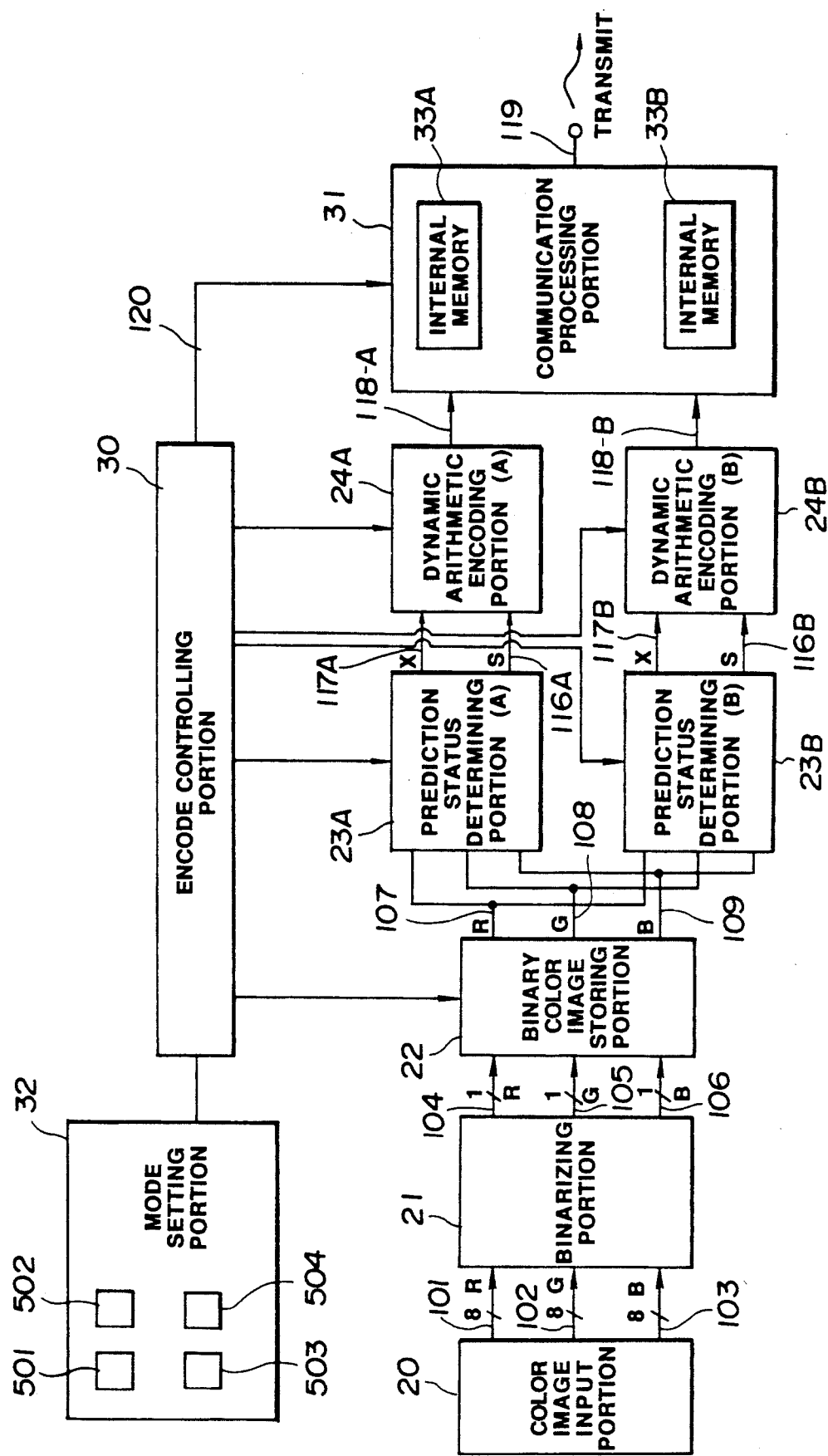

IMAGE ENCODING

BACKGROUND OF THE INVENTION

This invention relates to an image encoding apparatus, an image transmission apparatus and an image filing apparatus etc.

In order to increase the efficiency of image transmission or image storage, many image encoding methods or image compression methods are known.

These methods are generally divided into the following two categories:
(1) Information preserving type encoding, and
(2) Information non-preserving type encoding Information preserving type encoding is mainly used for encoding an image in which the amount of data is relatively small, such as black and white binary images.

A typical information preserving type encoding is MH coding or MR coding, used to encode a black and white binary image for a facsimile transmission.

Recently, a dynamic arithmetic encoding is technique has been developed, which encodes an image while dynamically predicting a pixel.

On the other hand, the alternative information non-preserving type encoding is mainly used for encoding an image in which the amount of data is relatively large, such as a full colour image.

For example, an encoding method that converts an 8-bit R,G,B signal into a luminance signal and chrominance signal, performs an orthogonal transformation (a discrete cosine transformation) on the converted signal, quantizes the transformed signal and Huffman codes the quantized signal has been proposed.

This encoding method reduces the amount of image data by deleting high spacial frequency images and saving low spacial frequency images. Accordingly, this encoding method is lossy and non-reversible. The encoding technique is efficient but there is a trade-off in terms of image deterioration.

The information non-preserving-encoding technique has an advantage in that it can efficiently encode a colour halftone image, with only a small deterioration in image quality. However, it has a disadvantage in that significant image deterioration occurs when a colour image having high spacial frequency, such as including characters or line drawings, is encoded.

In view of these circumstances, the assignee of the present application has proposed in U.S. Ser. No. 577312 (CF07021 US. EP) an encoding method which converts a colour image, e.g. characters or line drawings, into a binary colour image and then encodes the binary colour image using information preserving-type encoding.

In this proposed encoding method, a colour image having characters or line drawings, can be efficiently encoded, without a deterioration of the image.

Not only characters or line drawings but also a binary colour image obtained by pseudo halftone processing, e.g. dither method or error diffusion method, can be efficiently encoded without deterioration of an image by using the information preserving-type encoding.

When a binary colour image is encoded by information preserving-type encoding, the above proposed method separates a binary colour image into 3 planes and encodes each of the 3 planes, invididually. Namely, 3 planes of binary colour image are encoded plane sequentially (plane sequential encoding).

However, if a printer of the receiver side is not compatible with plane sequential encoding, for example, when the printer is a dot sequential printer and not a plane sequential printer, plane sequential encoding cannot be used, unless the receiver side is capable of converting plane sequential data into dot sequential data.

On the other hand, in cases where a binary colour image is encoded dot sequentially and not plane sequentially, if the printer of the receiver side is a plane sequential printer, the dot sequential encoding cannot be used unless the receiver side is capable of converting dot sequential data into plane sequential data.

If the receiver side can accept both plane sequential encoding and dot sequential encoding, it is desirable to encode the binary colour image by a more efficient encoding technique, because the efficiencies of encoding are different from each other, even if an identical image is encoded.

When a prediction coding technique, such as dynamic arithmetic encoding, is used as the information preserving-type encoding, a binary colour image representing a character or line drawings has a strong correlation between planes, so the efficiency of encoding can be increased by predicting an image to be encoded by referring to other planes.

However, a binary colour image obtained by a pseudo halftone process, such as the error diffusion method etc. has a weak correlation between planes, so the efficiency of encoding is likely to decrease when the prediction is performed by referring to other planes.

Whether other planes are referred or not must be decided in consideration of not only the content of an image to be encoded but also the decoding function of the receiver side.

Moreover, when a single plane of an image has both line drawings and half tone image, it is difficult to decide which encoding technique, namely referring other planes or not, is the more efficient. Accordingly, if the decision whether other planes are to be referred or not can be decided without the decision of an operator, binary colour image can be encoded with the most suitable encoding method.

SUMMARY OF THE INVENTION

The present invention has been made in the light of the above problems and its objective is to provide an image encoding method or apparatus which can efficiently encode an image.

The present invention also provides an image encoding method and apparatus which can perform an opitimum encoding operation suitable for the image to be encoded.

The present invention also provides the image encoding method and apparatus which can perform an encoding operation suitable for the function of the receiver side.

The present invention also provides an image encoding method and apparatus which are suitable for encoding colour images.

The present invention also provides an image encoding method and apparatus which can efficiently encode an image without manual instruction.

The aforesaid objectives and effects and other objectives and effects of the present invention are evident from the following explanations.

BRIEF DESCRIPTION OF THE DRAWINGS

FIG. 3 is a drawing to show the orders of encoding operations;

FIG. 4 to FIG. 6 are drawings to show the reference pixels;

FIG. 13 is a table to show a relation between the number of MC and the index I;

FIG. 15 is a table to show a renewal operation of Index I;

FIG. 16 is a table to show a selection of an effective probability;

FIG. 19 is a block diagram of another embodiment of image encoding apparatus;

DESCRIPTION OF THE PREFERRED EMBODIMENT

Figure 1:
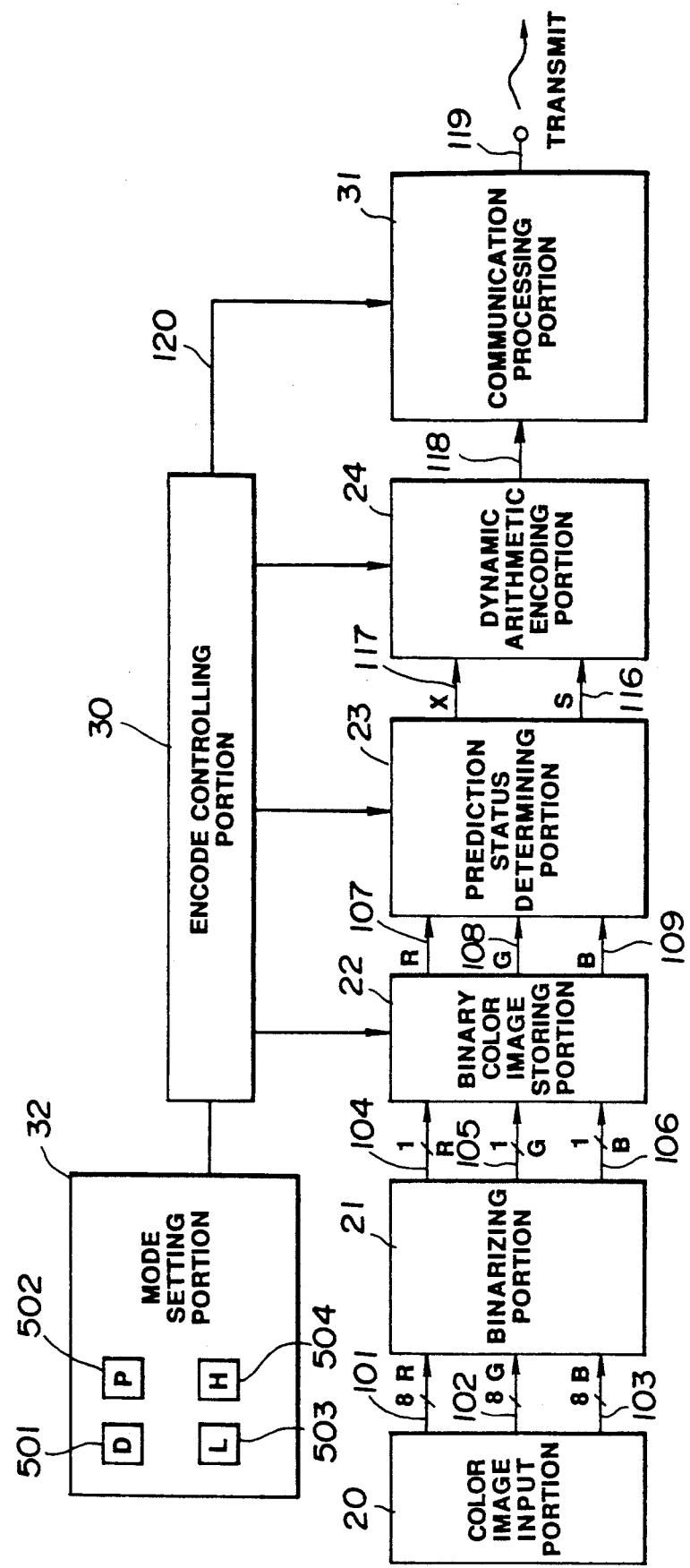
FIG. 1 is a block diagram of an image encoding apparatus of the present invention.

FIG. 1 is a block diagram of an image encoding apparatus to which the present invention may be applied.

A colour image input portion 20 is, for example, a colour scanner which scans a colour image, using a CCD sensor, and provides a multi-bit colour image signal, representing the full colour image. The multi-bit colour image signal consists of 8-bits of red (R) data 101, 8-bits of green (G) data 102 and 8-bits of blue (B) data 103.

The colour image input portion 20 may be a host computer, a video camera or any other suitable image data generating device.

A binary colour encoding system consists of a quantizing portion 21, a binary colour image storing portion 22, a prediction status determining portion 23 and a dynamic arithmetic encoding portion 24.

The quantising portion 21 converts the 8-bits of R data 101, G data 102 and B data 103 into 1-bit R data 104, 1-bit G data 105 and 1-bit B data 106, respectively.

The binary colour image storing portion 22 stores the binary R,G,B data 104, 105, 106 for each 3-colour bit plane. On completion of inputting the R,G,B data to be encoded into the binary colour image storing portion 22, binary colour signals R107, G108, and B109 are supplied to the prediction status determining portion 23.

The prediction status determining portion 23 determines the prediction status which is used for encoding operations by the dynamic arithmetic encoding portion 24. The prediction status determining portion 23 detects the status (1 or 0) of each of N pixels already encoded around the pixel to be encoded and recognises a particular one of 2N possible statuses. The recognition result is supplied to the dynamic arithmetic encoding potion 24 as a prediction status signal S116. At the same time, the prediction status determining portion 23 supplies a pixel signal X117, representing the status (1 or 0) of the pixel to be encoded, to the dynamic arithmetic encoding portion 24.

The dynamic arithmetic encoding portion 24 encodes the pixel signal X117, using an arithmetic code. Namely, the dymamic arithmetic encoding portion 24 classifies the status of N pixels into 2N statuses on the basis of the status signal S116 and performs the arithmetic encoding while dynamically predicting the status 1or 0) of the pixel to be encoded, in accordance with the classified status.

Header data is added to the encoded data by an encode controlling portion 30 and the encoded data is transmitted to the digital network, e.g. I.S.D.N., by a communication processing portion 31. The protocol performed by the communication processing portion 31 follows that of G4 facsimile transmission.

The quantizing portion 21 is adapted to selectively perform either a simple binarizing process or a half tone process such as a dither process, or an error diffusion process, both of which are well-known art.

A mode setting portion 32 is, for example, provided on an operation section of an image processing apparatus to set an encoding mode. The mode setting portion 32 has four keys for setting an encoding mode. Key 501 is used to set a dot sequential-encoding mode. Key 501 is used to set a plane sequential encoding mode. Key 503 is operated when an image to be encoded is a line tone image, and key 504 is operated when an image to be encoded is a half tone image.

Figure 2A:
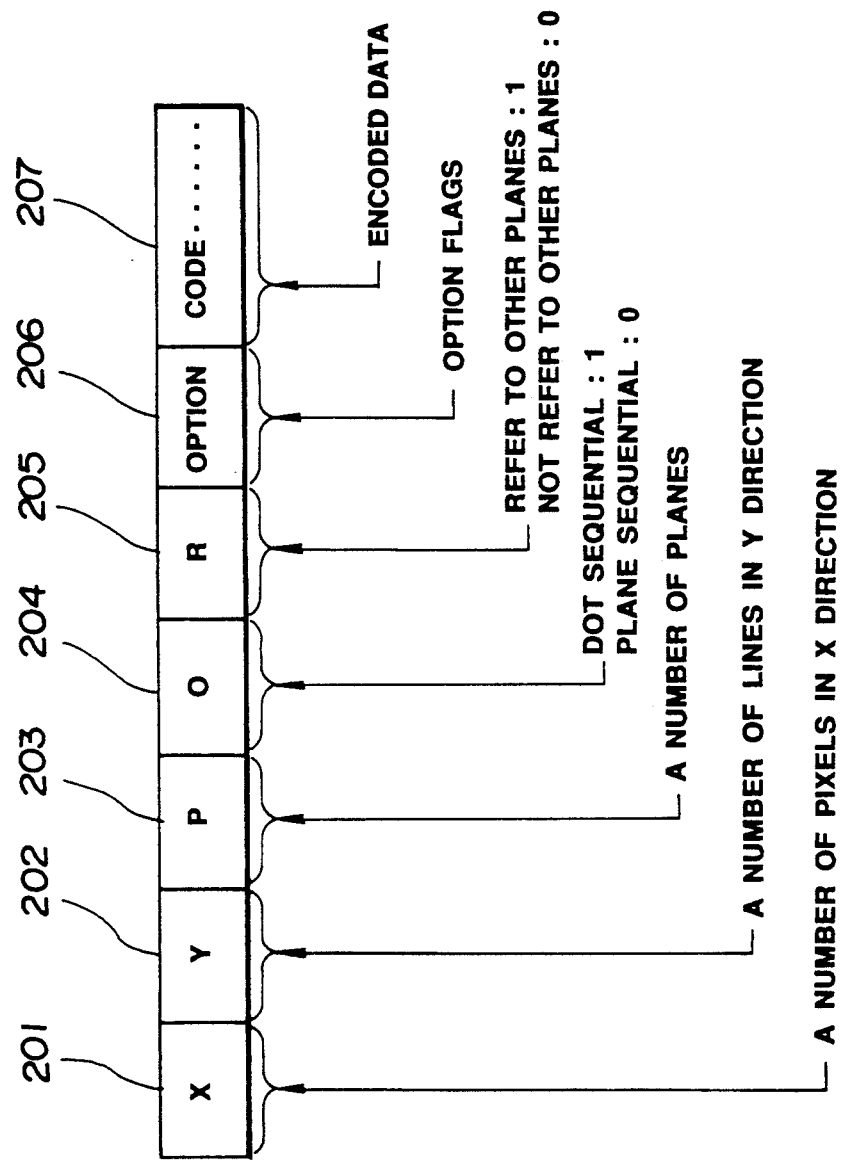
FIG. 2A is a drawing to show a format of encoded data.

FIG. 2A shows the header data which is added to the encoded data by the encoding controlling portion 30 in accordance with the encoding mode set by the mode setting portion 32.

Data 201–206 are 8-bits of the header data, respectively, and data 207 are the encoded data (bit stream).

Data 201–205 represent encoding modes, data 201 represent a number of pixels in the X direction and data 20 represent a number of lines in the Y direction. Data 203 represents a number of planes of the image to be encoded (in this embodiment, the image consists of R,G,B planes, i.e. p=3). Data 204 is an O-flag which indicates whether the encoding operation is performed dot sequentially or plane sequentially. Data 205 is an R-flag indicating whether planes other than the plane to be encoded are referred to or not. Data 206 is an option flag by which, for example, a kind of binarizing process or an information for colour process may be indicated.

In this embodiment, four types of encoding modes can be expressed by the combination of the O-flag and the R-flag.

Figure 2B:
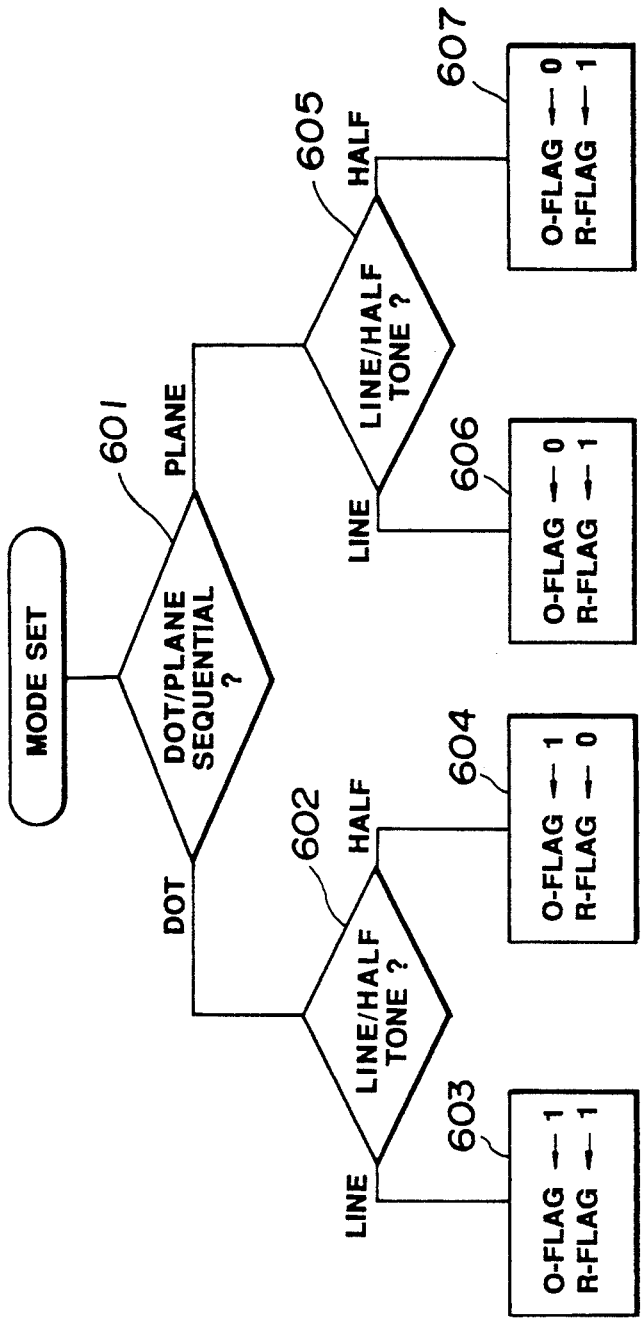
FIG. 2B is a flow chart of a mode setting operation.

FIG. 2B is a flow chart which shows an operation of the encoding controlling portion 30 in accordance with the instruction from the mode setting portion 32.

An operator selects either the dot sequential encoding mode or the plane sequential encoding mode, by using key 501 or key 502 of the mode setting portion 32. This selection is made in accordance with the function of the printer, namely a dot sequential printer or a plane sequential printer.

Also, an operator indicates characteristics of an image to be encoded, namely, a line tone image or a half tone image.

The encoding controlling portion 30 controls the O-flag and the R-flag in accordance with the operation of the key 501-504.

In FIG. 2B, the encoding controlling portion 30 discriminates whether the dot sequential encoding mode or the plane sequential encoding mode has been selected (step 601).

If the dot sequential encoding mode has been selected, the encoding controlling portion 30 discriminates whether the image to be encoded is a line tone image or a half tone image (step 602).

If the image is a line tone image, the R-flag, which indicates that planes other than the plane to be encoded are to be referred to, is set to "1" (step 603). This is because line tone image has a strong correlation between its planes and it is better that the encoding is performed by referring to other planes. In step 603, the O-flg, which represents the dot sequential encoding mode, is set to "1".

On the other hand, if the image is a half tone image, the R-flag is set to "0" (step 604). This is because a half tone image does not have a strong correlation between its planes and it is not necessary to refer to other planes. In step 604, the O-flag is set to "1".

In step 601, if the plane sequential encoding mode has been selected, the encoding controlling portion 30 discriminates whether the image to be encoded is a line tone image or a half tone image (step 605).

If the image is a line tone image, the O-flag is set to "0" and the R-flag is set to "1" for performing the plane sequential encoding by referring to other planes (step 606).

If the image is a half tone image, the O-flag is set to "0" and the R-flag is set to "0" for performing the plane sequential encoding without referring to other planes (step 607).

When the receiver, however, does not have a function to decode the encoded data by referring to other planes, the R-flag is always set to "0" not to refer to other planes, regardless of the content of an image to be encoded.

Accordingly, instead of the key 503, 504, another key may be provided, for arbitrarily selecting either encoding modes referring to other planes or encoding modes not referring to other planes.

FIG. 3 shows the order of encoding processes which are expressed by the O-flag. The mark * in the figure shows the pixel to be encoded.

FIG. 3(a) shows the order of plane sequential encoding (the O-flag =0) and FIG. 3(b) shows the order of dot sequential encoding (the O-flag=1).

In case of the plane sequential encoding shown in FIG. 3(A), encoding operations are performed for each plane. First, pixels on a first plane are encoded pixel by pixel in a raster fashion (in this embodiment, R-plane). A plurality of rhombi show reference pixels.

After all pixels on the first plane have been encoded, pixels on the second plane (G-plane) are encoded in raster fashion. Finally, all pixels on the third plane (B-plane) are encoded in a similar manner and the encoded data 207 is outputted.

In case of the dot sequential encoding shown in FIG. 3(B), a plurality of pixels at the same position on each plane are successively encoded. First, a pixel of the first plane (R-plane) is encoded and then a pixel at the same position on the second plane (G-plane) is encoded. Finally, a pixel at the same position on the third plane (B-plane) is encoded. Thereafter, the next pixel on each of the first, second and third planes will be encoded in a similar manner.

As explained above, in this embodiment, either one of the plane sequential encoding and the dot sequential encoding can be selected by using the O-flag.

The position of reference pixels, referred to for prediction of status, will now be described.

It is decided whether the other planes are referred to or not in accordance with the R-flag.

FIG. 4 shows the position of reference pixels. In each of the first, second and third planes, reference is made to twelve pixels already encoded around the pixel to be encoded, which is indicated by the mark *.

In the case where the position of reference pixels shown in FIG. 4 is indicated by the R-flag (R-flag=0), the encoding process is performed in the order shown in FIG. 3(A) in which plane sequential encoding is selected by the O-flag (O-flag=0) and the encoding process is performed in the order shown in FIG. 3(B) in which dot sequential encoding is selected by the O-flag (O-flag=1).

In both encoding processes, the number of reference pixels is 12 so the number of prediction statuses is raised to the power 12.

Figure 5:
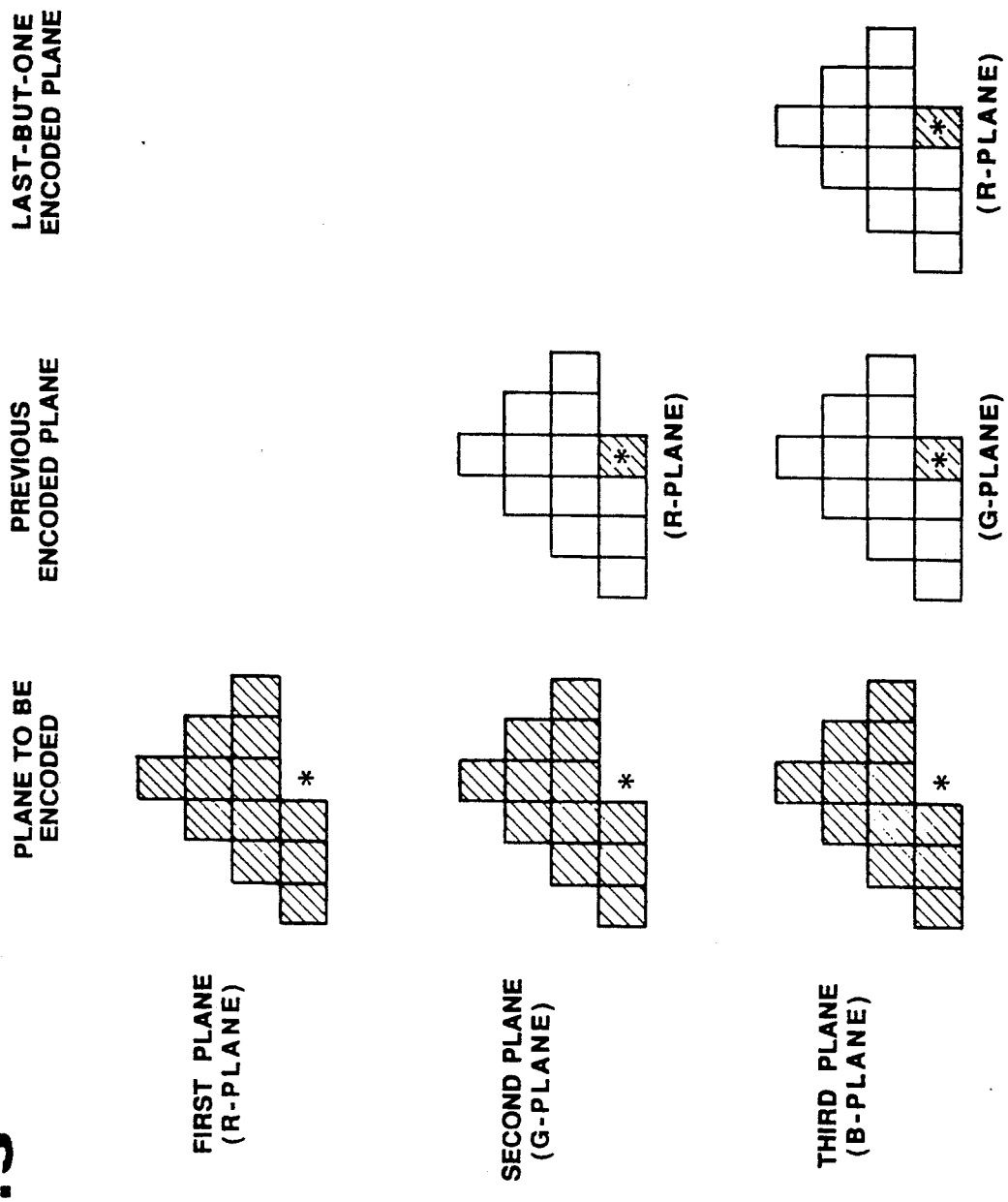

FIG. 5 shows the position of reference pixels, in which other planes are referred to for the plane sequential encoding (O-flag=0, R-flag=1). The diagonal line pixels are reference pixels for each plane.

At the encoding of the first plane, other planes are not referred to because the other planes have not been encoded yet. Accordingly, reference is made to the 12 pixels already encoded at around the pixel to be encoded and the number of prediction statuses is raised to the power 12 and all pixels on the first plane are encoded in a raster fashion.

At the encoding of the second plane, any pixels on the first plane can be referred to because the first plane has been encoded already. A pixel at the same position on the first plane as the pixel to be encoded on the second plane is referred to, thereby improving the efficiency of encoding. Namely, reference is made to the 12 pixels already encoded on the same plane and 1 pixel at the same position on the first plane. Accordingly, the number of prediction statuses becomes 2 raised to the power 13.

During encoding of the third plane, after encoding the second plane, reference is made to the 12 pixels already encoded on the third plane and the 2 pixels at the same position on the first and the second planes already encoded. Accordingly, the number of reference pixels is 14 and the number of prediction statuses is raised to the power 14.

When all pixels on the third plane have been encoded, the entire encoding process is completed.

Figure 6:
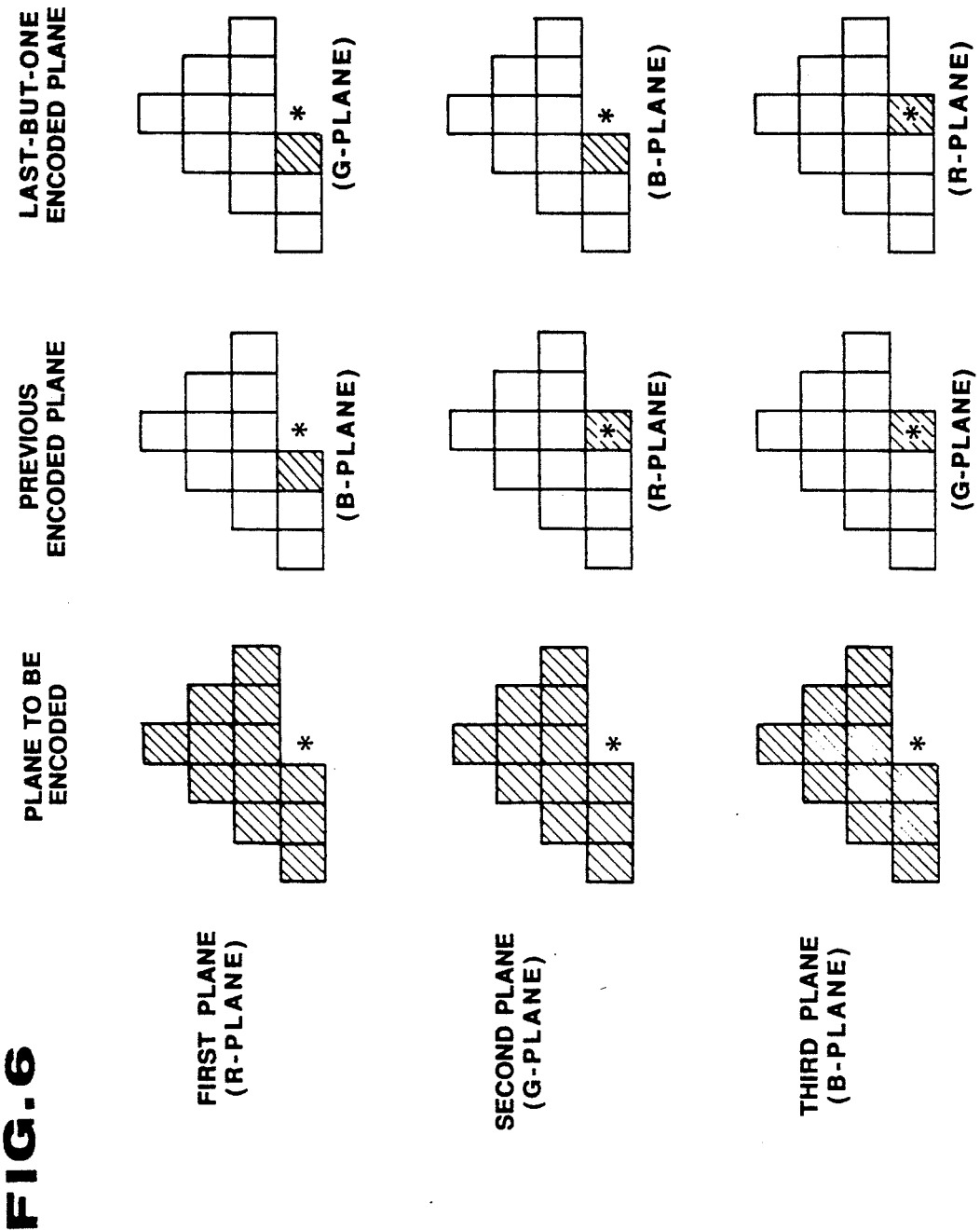

FIG. 6 shows the position of reference pixels, when other planes are referred to during dot sequential encoding. (O-flag=1, R-flag=1).

The order of the encoding process is that shown in FIG. 3(B). At the encoding of every plane, other planes can be referred to because pixels at the same position and pixels around the pixels to be encoded for every plane are supplied in a parallel manner.

During first plane encoding, pixels on the second and third planes at the same position as the pixel to be encoded on the first plane have not been encoded yet, so previous pixels in a raster order on the previous encoded plane (third plane) and the last-but-one encoded plane (second plane) are referred to. Namely, previous pixels already encoded are referred to. Accordingly, reference is made to 14 pixels, namely, the 12 pixels around the pixel to be encoded, 1 pixel on the previous encoded plane and 1 pixel on the last-but-one encoded plane and the number of predection statuses becomes 2 raised to the power 14.

Next, the pixel at the same position on the second plane is encoded. At the encoding of the second plane, reference is made to 12 pixels around the pixel to be encoded and 2 pixels previously encoded, namely, the pixel at the same position on the first plane and the previous pixel in a raster order on the third plane. Accordingly, the number of reference pixels is 14 and the number of prediction statuses is raised to the power 14.

Next, the pixel at the same position on the third plane is encoded. At the encoding of the third plane, reference is made to 12 pixels around the pixel to be encoded and 2 pixels previously encoded, namely, the pixels at the same position on the second and first planes. Accordingly, the number of the reference pixels is 14 and the number of prediction statuses is raised to the power 14.

On completion of the encoding process the pixel at the same position on the third plane and the next pixel in the raster order on the first plane are encoded. In this way, all pixels on the first, second and third planes are encoded in a dot sequential manner.

In dot sequential encoding, it has been made possible to refer to the pixels at the positions shown in FIG. 5. Namely, at the encoding of he first plane, reference is made to only pixels around the pixel to be encoded on the first plane. At the encoding of the second plane, reference is made to the pixel at the same position on the first plane and pixels around the pixel to be encoded on the second plane. During encoding of the third plane, reference is made to pixels at the same position on the first and second planes and pixels around the pixel to be encoded on the third plane.

As explained above, the image encoding apparatus of this embodiment has two types of encoding order. (plane/dot sequential) and two types of reference position (refer to/do not refer to other planes). Accordingly, this apparatus has four encoding modes.

Figure 7:
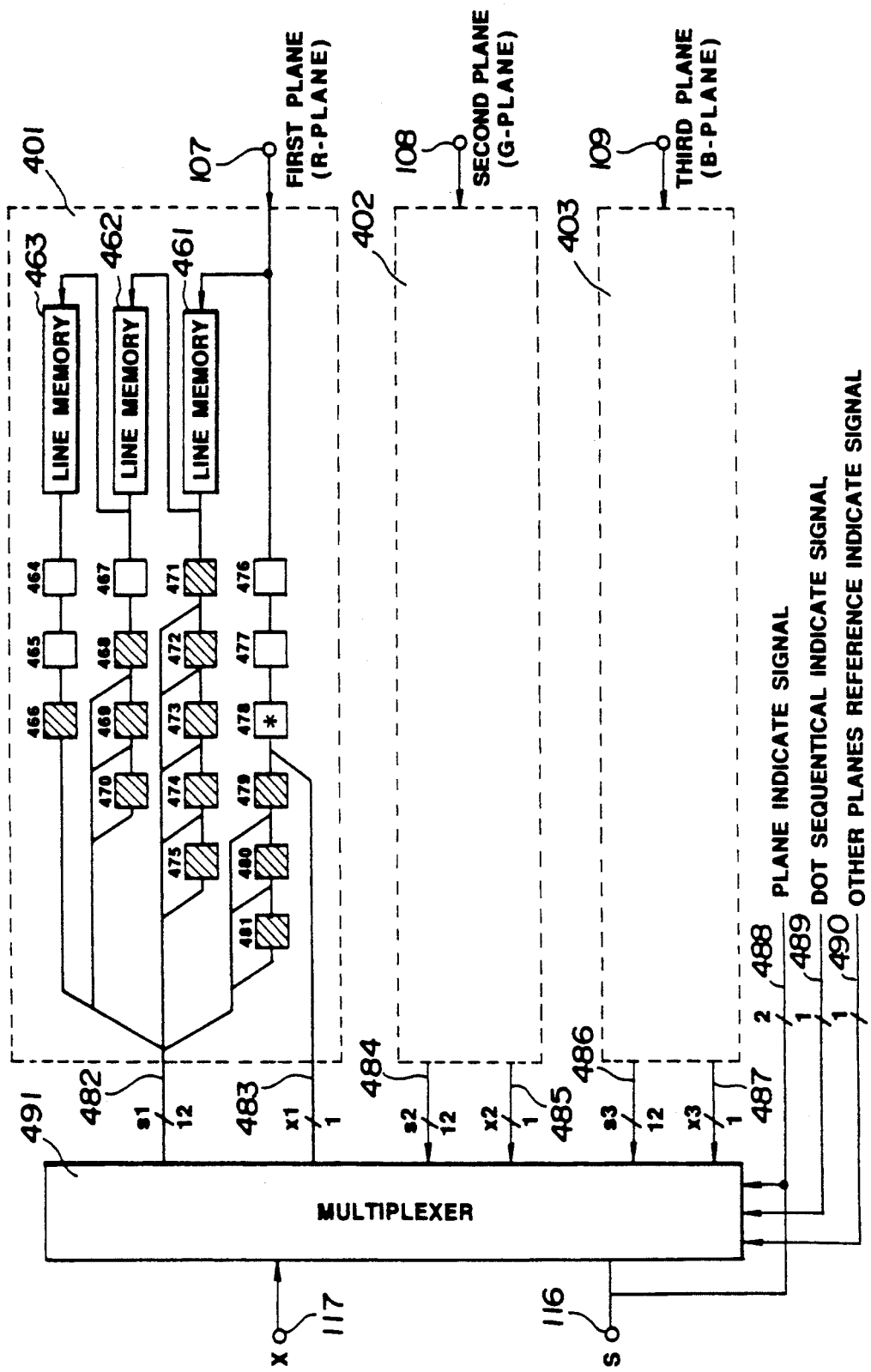
FIG. 7 is a block diagram of a prediction status determining portion.

FIG. 7 is the block diagram of the prediction status determining portion 23 so as to allow it to preform the four encoding modes.

Binary colour signals R107, G108, and B109 are supplied in raster order as the first, second and third planes, respectively.

Prediction status forming portions 401, 402 and 403 form the prediction status signals for each plane. These portions 401, 402 and 403 are of similar construction so the construction and operation of the portion 401 will be described.

Binary colour signal R107 (of the first plane) is supplied to the line memories 461, 462, 463 each of which can store a line of pixels. The line memories 461, 462, 463 hold the binary colour signal delayed by one line. Accordingly, 4 consecutive lines of binary colour signals are supplied to latches 464–481 in a parallel manner.

Binary colour signal 107, of the encoding lines, is directly supplied to and stored in the latches 476–481, in a raster order. A binary colour signal of a preceding line is supplied from the line memory 461 to the latches 471–475, a binary colour signal of a line prior to the preceding line is supplied from the line memory 76 to the latches 467–470 and a binary colour signal is supplied from the line memory 463 to the latches 464–466. The latches 464–481 hold the binary colour signal while shifting at signal pixel by pixel.

The latch 478 (marked with *) holds the binary colour signal of the pixel to be encoded and latches 466, 468–475, 479–481 hold the binary colour signal of the 12 pixels already encoded, around the pixel to be encoded.

The status of the pixel to be encoded and the statuses of the pixels around the pixel to be encoded are represented by an encoding pixel signal X1 483 and a status signal S1 482, respectively, and both signals are input to a multiplexer 491.

At the multiplexer 491, encoding pixel signals X2 485, X3 487 and status signals S2 484, S3 486, concerning the second and third planes from the prediction status forming portions 402, 403 are also input. The multiplexer 491 multiplexes input signals in accordance with a plane indicated signal 488, a dot sequential indicated signal 489 and, on other planes, reference indicated signal 490, and generates the pixel signal X117 and the prediction status sgnal S116.

The plane indicated signal 488, the dot sequential indicated signal 489 and the other plane reference indicated signal 490 are supplied by the encoding controlling portion 30. The dot sequential indicated signal 489 is supplied in accordance with the status of the O-flag and the other plane references indicate signal 490 is supplied in accordance with the status of the R-flag.

The plane indicated signal 488 represents the plane which is currently being encoded and, in this embodiment, the signal 488 consists of 2-bits, so as to represent 3-planes.

When the dot sequential indicated signal 489 is "1", dot sequential encoding as shown n FIG. 3(B) is selected and the multiplexer 491 operates such that the plane to be encoded is changed whenever a pixel is encoded.

When the dot sequential indicated signal 489 is "0", plane sequential encoding as shown in FIG. 3(A) is selected and the multiplexer 491 operates such that pixels to be encoded and pixels to be referred are selected.

When the other planes reference indicated signal 490 is 1 and when the dot sequential indicated signal 489 is 0, the multiplexer 491 operates such that pixels to be referred are selected as shown in FIG. 5. When the dot sequential indicate signal 489 is 1, the multiplexer 491 operates such that pixels to be referred are selected as shown as in FIG. 6.

As explained above, any one of four encoding modes may be selected, in response to the dot sequential indicated signal 489 and the other planes reference indicated signal 490.

The binary colour signal of the pixel to be encoded and the binary colour signals of the pixels to be referred to are supplied from the multiplexer 491 as the pixel signal x117 and the prediction status signal S116, in response to the selected encoding mode. The prediction status signal S116 becomes a 16-bit data signal, including the plane indicated signal (2-bit data).

Figure 8:
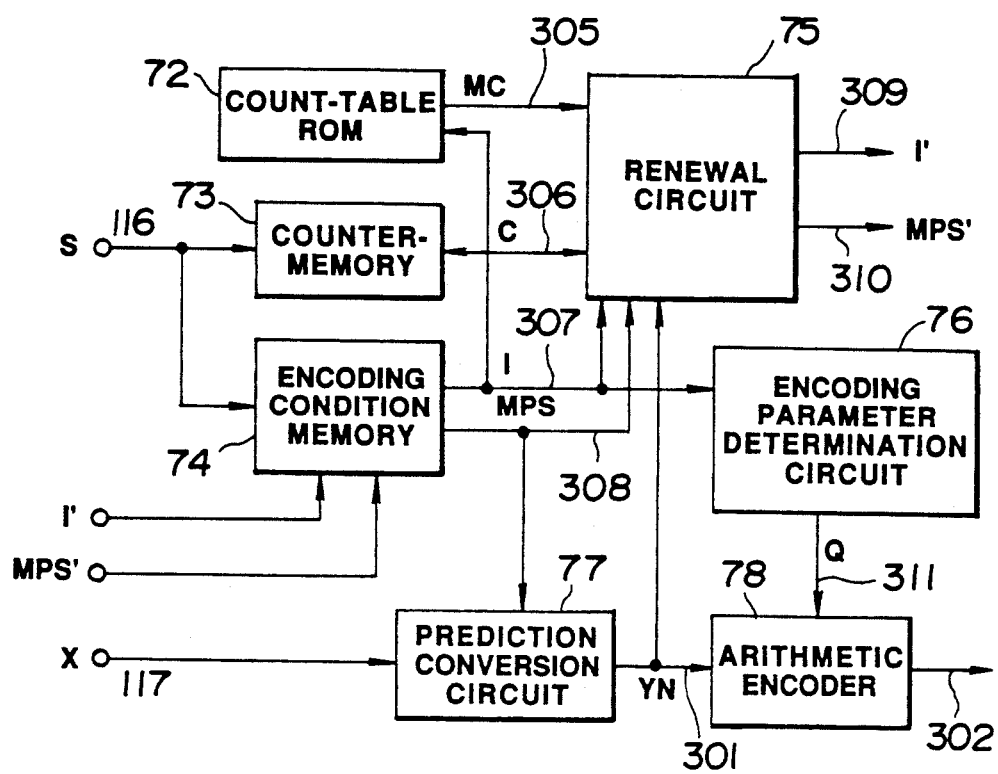
FIG. 8 is a block diagram of an encoder.

FIG. 8 is the block diagram of the dynamic arithmetic encoding portion 24 shown by FIG. 1.

Before going into the explanation of FIG. 8, an explanation shall be given on the arithmetic code used in the present embodiment.

As is known, arithmetic encoding is the method to form the code by arithmetic operation in such way that an input signal series shall become the code expressed by a decimal binary number. This method has been published in the literature by Langdon and Rissanen et al entitled "Compression of Black/White Images with Arithmetic Coding" IEEE Tran Com. COM-29, 6, (1981.6) etc. According to this literature, when an already encoded input signal series S is represented by S, the probability at which the less probable symbol (LPS) is given is represented by q, operation register Augend is represented by A(S) and code register is represented by C(S), the following arithmetic operation is executed for each input signal:

$$A(S1) = A(S) \times q \text{ approx} = A(S) \times 2^{-Q} \quad (1)$$

$$A(S0) = <A(S) - A(S1)>1 \quad (2)$$

$<>1$ indicates rounding at 1 bit of effective digits $$C(S0) = C(S) \quad (3)$$

$$C(S1) = C(S) + A(S0) \quad (4)$$

Here, when encoded data are the more probable symbol (MPS: 0 in the above case), A(S0) and C(S0) are used for encoding of the succeeding data. When the encoded data are the less probable symbol (LP: 1 in the above case), A(S1) and C(S1) are used for encoding of the succeeding data.

The new value A is multiplied by $2^S$ (S is an integral number larger than 0) and set between $0.5 < A < 1.0$. This processing corresponds to S times of shifting of operation register A when implemented in hardware. The same number of shifts is made for code register C and the signal shifted out becomes the code. Code formation is made by repeating the above processing.

As shown in the equation (1), by approximating the appearance probability 1 of LPS by the power of 2 ($S^{-Q}$: where Q is a positive integer), multiplication is replaced by a shift operation. To improve this approximation, q is approximated by the polynomial expression of the power of 2 as shown in equation (5). By such approximation, the worst point of efficiency is improved.

$$q = 2 - Q1 + 2 - Q2 \quad (5)$$

As for arithmetic code, the value of Q may be changed for each encoded data and therefore the probability estimation section can be separated from encoding.

In the present embodiment, a dynamic method to estimate the probability, while conducting encoding, is employed, as stated above.

The next explanation shall be made on the block diagram of encoder 24 of FIG. 8 which executes arithmetic encoding.

Status signal S 116, coming from the prediction status determining portion 23, is input into the counter-memory 73 and encoding conditions memory 74.

At the encoding conditions memory 74, the more probable symbol MPS 308 is memorized, which is the symbol more probably given, as is index I 307, which indicates the encoding conditions containing the appearance probability of LPS of arithmetic code to be stated later, for each status of each colour of R, G and B. MPS 308 is read out of encoding condition memory 74, according to the colour and status of the image to be encoded, and is input to a prediction converting circuit 77, while the prediciton converting circuit 77 produces a YN signal 301, which becomes zero when a serial pixel signal X117 agrees with the MPS 308. YN signal 301 is input into renewal circuit 75 and at the renewal circuit 75, when YN signal 301 is 0, the count value corresponding to the current status among the count values memorized in counter memory 73 is incremented. When the count value C306 memorized in the counter memory 73 agrees with the set value MC305 coming from count-table ROM 72, renewal is made in the direction where index I307 becomes larger (in the direction where appearance probability 1 of LPS becomes smaller). (Inversion of MPS is not executed.)

Count-table ROM72 supplies the renewal circuit 75 with MC305, the number of MPS indicated in FIG. 13 which is determined in correspondence to index I, expressed by the appearance probability P of LPS.

At the renewal circuit 75, when MPS 308 does not agree with pixel signal X117, i.e., when YN signal 301 from prediction conversion circuit 77 is 1, renewal is made in the direction where index I307 becomes smaller (in the direction where appearance probability q of LPS becomes larger). If YN signal 301 with value 1 is given when the index is 1, processing is made to invert MPS (0 to 1 or 1 to 0). Output I' 309 and MPS' 310 of renewal circuit 75 are the values of the index after renewal and they are re-memorized in the encoding condition memory 74.

At the encoding parameter determination circuit 76, encoding parameter Q311 of arithmetic code is set on the arithmetic encoder 78, based on the value of index I307. At this arithmetic encoder 78, YN signal 301 coming from prediction conversion circuit 77 is made into an arithmetic code, using parameter Q311 to obtain the code 302.

By providing an initial value to the encoding condition memory 74 and not renewing I and MPS, static encoding is realized easily.

Figure 9:
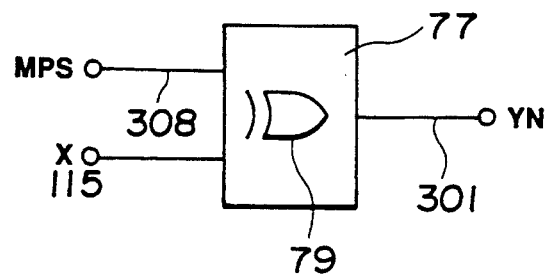
FIG. 9 is a block diagram of a prediction conversion circuit.
Figure 10:
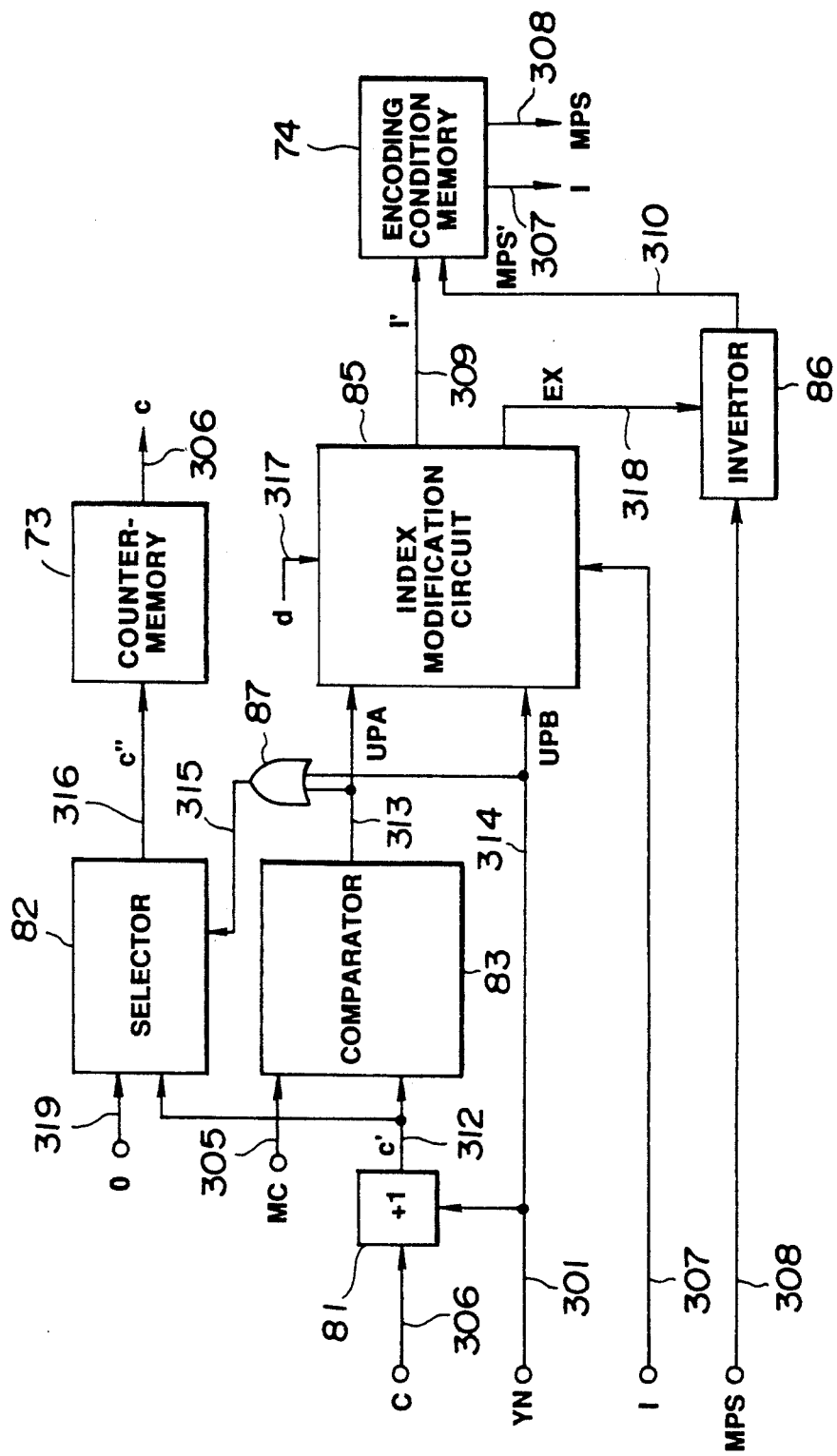
FIG. 10 is a block diagram of a renewal circuit.

FIG. 9 is the block diagram of prediction conversion circuit 77. Serial pixel signals X115 and MPS 308 are input into the EX-OR circuit 79 and according to the logical formula of FIG. 14, YN signal 301 which becomes 0 when the serial pixel signal X117 agrees with MPS 308 and becomes 1 when they disagree. FIG. 10 is the block diagram of renewal circuit 75. When the YN signal 301 is 0, the count value C306 coming from counter memory 73 is incremented by +1 by the adder 81 to become the signal C'312.

This value is compared with MC305 coming from count table ROM72 at comparator 83 and when the value of C' agrees with the value of MC, renewal signal UPA 313 is set at 1. YN signal 301 becomes the renewal signal UPB314 while UPA and UPB enter the index modification circuit 85. Logic OR is taken for UPA and UPB at OR circuit 87 and output signal 315 of OR circuit 37 becomes the changeover signal of selector 82. At selector 82, when the signal 315 is 1, it selects 0 signals 319 to reset the value of counter memory 73, and at other times, it selects output signal C' 312 of adder 81 and it is output as the counter renewal signal C'' 316 and counter memory 73 memorizes it. Therefore when serial pixel signal X115 does not agree with MPS 308 and when the agreement status continues for preset times, the count value of counter memory 73 is reset.

To the index modification circuit 85, the signal d317 (d=1 in standard case) which controls the renewal pitch of the index, UPA313, UPB 314 and the present index I303 from encoding condition memory 74 are input.

FIG. 15 is the table to indicate the method of renewal of the index at the index modification circuit 85 (FIG. 15 represents the cases when renewal pitch is d=1 and d=2). By referring to this table for the present index I, renewal pitch condition d, UPA and UPB, the renewed index I' is determined. When I=1 and UPB=1 (when serial pixel signal X115 disagrees with MPS 308), EX signal 318 is set at 1. When EX signal 318 is 1, the symbol of the present MPS 308 is inverted (0 to 1 or 1 to 0) by invertor 86 to obtain the renewal MPS'310. When Ex signal 318 is 0, MPS' is not modified. Thus renewed I' 309 and MPS' 310 are memorized in encoding condition memory 74 and they are used as the index I and MPS for the succeeding processing. The method of renewal shown in FIG. 15 may be composed of the table by using ROM etc. or of logics using adder-subtractor.

As aforesaid, when the number of appearance of MPS comes to the number of MPS determined by the value of index I which expresses the appearance probability q of LPS approximated by the polynomial of the power of 2, index I is increased by d to reduce the appearance probability q of LPS representing 0.5 (the status where index I is 1), and the MPS is inverted.

As aforesaid, by renewing index I and MPS in adaptation to the input image, arithmetic encoding with excellent encoding efficiency is realized.

Figure 11:
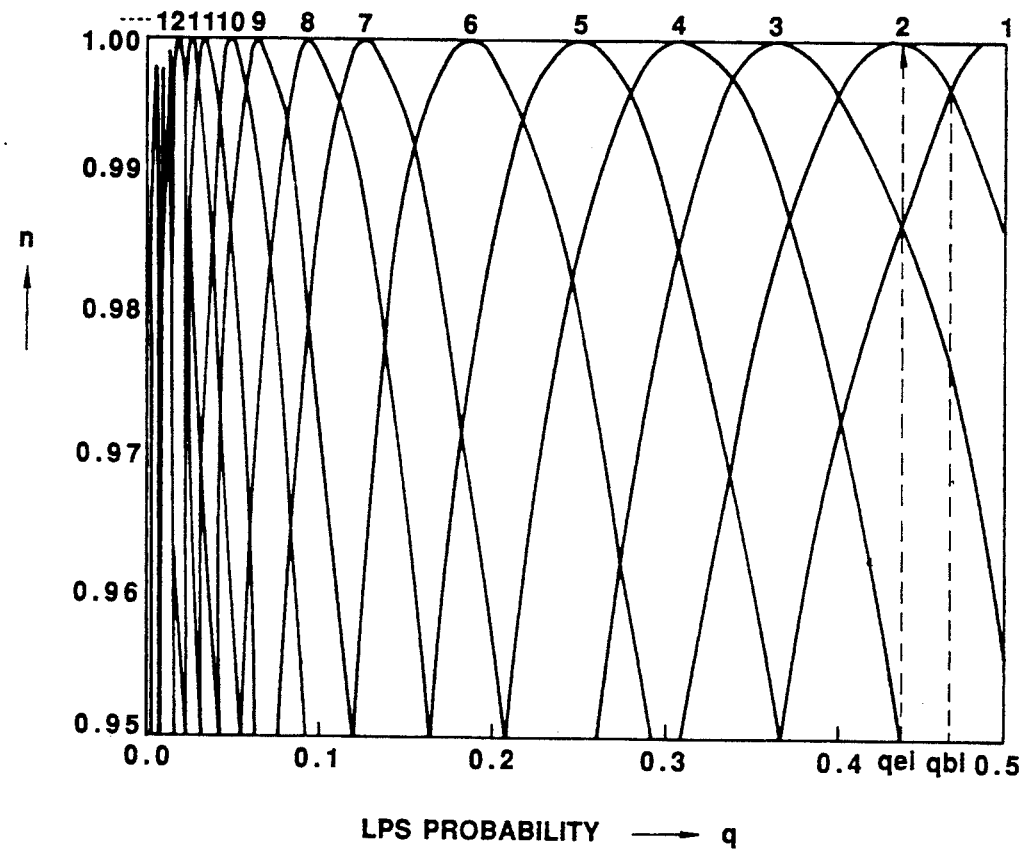
FIG. 11 is the drawing to show the encoding efficiency curve.

FIG. 11 shows the encoding efficiency curve of arithmetic code used in the present embodiment. Hereafter, the value of index I is shown by small letter i. The curve is represented by the formula (6) when the appearance probability of LPS is represented by P and approximation probability at encoding time is represented by $q_{ei}$. Index I is sequentially given from 1, 2, 3 ... from the side where appearance probability q of LPS is larger toward the side where it is smaller.

$$n = -q \log2 q - (1 - 1) \log 2 (1 - q) - \\ q \log2 qei - (1 - q) \log2 (1 - qei) \quad (6)$$

qei is the value represented by equation (7).

$$q_{ei}=q1+q2 \quad (7)$$

The values of q1 and q2 are the polynomial approximation vlaues of the power of 2 and they are given by FIG. 16. For example, they are shown by (8)–(10) below, $$qei'=2^{-2}+2^{-2}=2^{-1} \quad (8)$$

$$qe2'=2^{-1}-2^{-4} \quad (9)$$

$$qe3'=2^{-2}+2^{-2} \quad (10)$$

The peak point $q_{ei}$ where efficiency n becomes 1.0 at this probability shall be called hereafter effective probability. The cross of the efficiency curves is called boundary probability $q_{bi}$ and it is evident that beyond this probability, the efficiency is better if encoding is executed using the adjacent effective probability.

In the present example of practice, effective probability Pei shown in FIG. 16 is selected from the probabilities which may be approximated by two terms as shown in equation (5). Q1, Q2 and Q3 of FIG. 16 are the encoding parameters Q 311 (FIG. 8) to be transmitted to arithmetic encoder 78. That is, Q1 and Q2 represent the shift volume to be given to shift register and by such shift operation, power of 2 calculation is performed. Q3 shows the coefficient at the second term and it makes the +, − changeover.

The value of MC in FIG. 13 is determined in the following way.

When the number of LPS is NL and the number of MPS is NM, the appearance probability of LPS is given by equation (11).

$$q = \frac{NL}{NM + NL} \quad (11)$$

When this equation is solved by NM, equation (12) is given.

$$NM=[NL(1/q-1)] \quad (12)$$

Here, [x] expresses the raising of the numbers below decimal point. By substituting q in equation (12) by qbi shown in FIG. 11, the number NMi of more probable symbol (MPS) is calculated. Therefore MC can be calculated from equation (13).

$$MCi=NMi+1-NMi \quad (13)$$

The values of MC in FIG. 13 have been calculated from equations (11), (12) and (13) assuming ML=2. As aforesaid, the number NMi of the more probable symbol MPS corresponding to each index I is obtained based on each boundary probability qbi shown in FIG. 11 and the difference in the more probable symbol NM between the adjacent indexes is deemed to be the MC for the respective index I.

The value of MC is compared with the number of more probable symbol MPS generated as aforesaid and if the value of MC agrees with the number of continuous generation of more probable symbol MPS, it is judged to be the status where encoding by the adjacent index I is suitable and index I is modified. Thus index I is modified by good timing based on the number of generation of more probable symbol MPS and encoding by the optimum index I is achieved with good adaptation.

Figure 12:
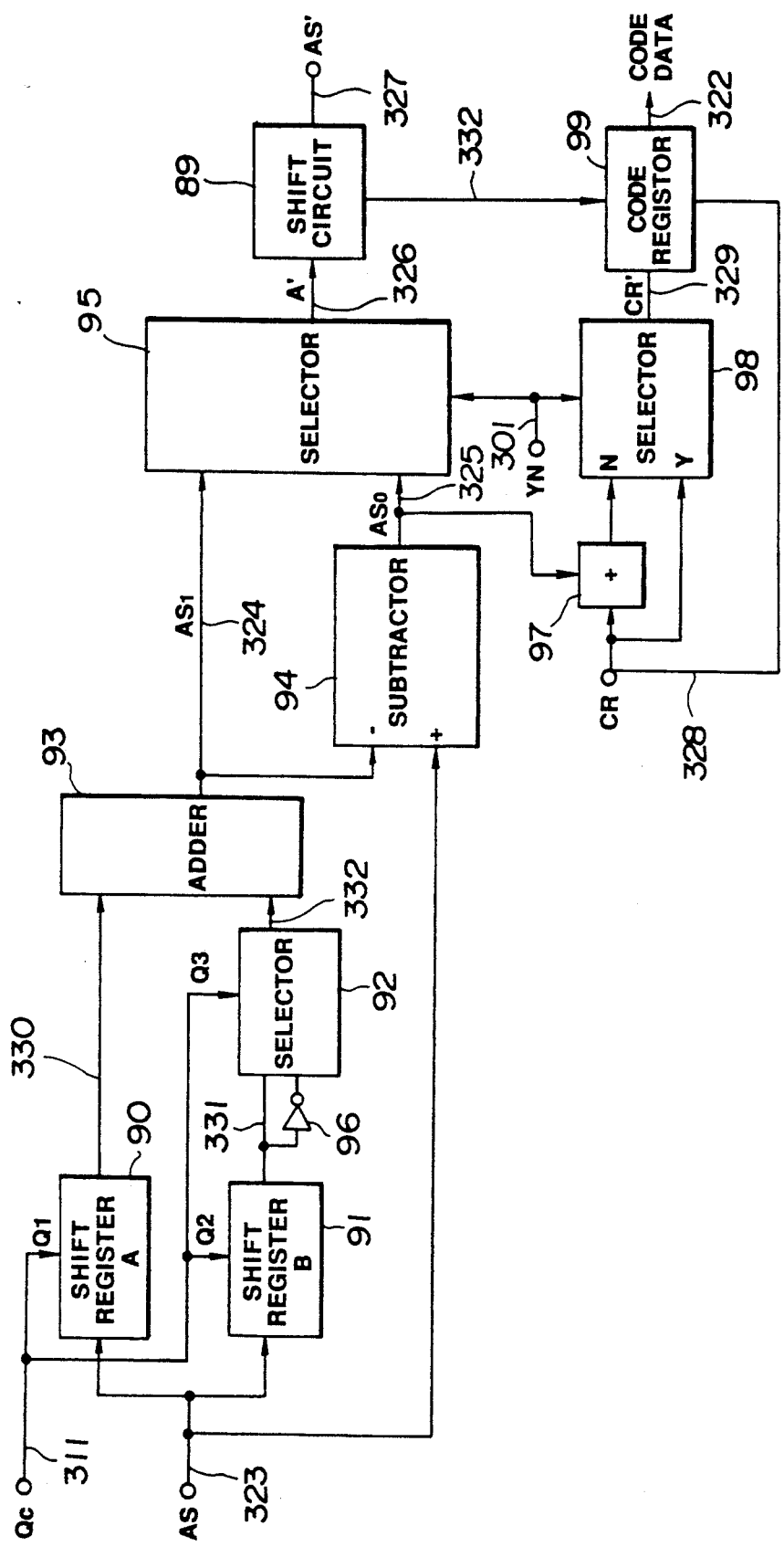
FIG. 12 is a block diagram of an arithmetic encoder.

FIG. 12 is the block diagram of arithmetic encoder 78. Out of the encoding parameter Q311 (FIG. 8) determined by encoding parameter determination circuit 76, Q1 is entered into the shift register A0, Q2 is entered into the shift register B91 and Q3 is entered into the selector 92. Q1 and Q2 indicate for how many bits the Augend signal As 323 should be shifted to the right as against the shift registers A and B. The results of such shift are represented by output signals 330 and 331.

Inverter 96 provides the complement of signal 331 and selector 92 selects the signal 131 or the output signal from inverter 96 by control signal Q3 to obtain the output signal 332. At the adder 93, signal 330 coming from shift register A90 and signal 332 from selector 92 are added and SS1 signal 324 is given out. At the subtractor 94, AS1 signal 324 is subtracted from As signal 323 to obtain As0 signal 325. At selector 95, either the As0 signal 325 or the As1 signal 324 is selected according to the YN signal 301. That is, when the YN signal is 1, the A0 signal is selected and when the YN signal is 0, the As1 signal becomes A' signal 326. At shift circuit 89, leftward shift processing is continued unitl MSB of A' signal 326 becomes 1 and by such shift, AS' signal 327 is obtained. Shift signal 332 corresponding to the frequency of such shift enters into the code register 99 and from code register 99, the number of bits corresponding to the shift frequency are output one after another at MSB to produce the code data 322.

Code data 322 are so processed by the bit processing method not indicated in the figure that the continuation of bit 1 shall be allowed up to a certain limit.

The content CR328 of code register 99 is added to AS0 signal 325 at the adder 97 and enters into selector 98. Signal CR328 to which no AS0 signal 325 has been added also enters into the selector 98 and it is output as as CR' signal 329 which is equal to CR when the YN signal 301 is 1 and is equal to CR+AS0 when the YN signal 301 is zero. The shift processing stated above, with reference to the code register 99, is the processing done for CR' signal.

The code data 322 generated from code register 99 is supplied to the communication processing portion 31 via data line 118.

As explained above, in this embodiment, a colour image is separated into the R, G, B planes each of which consists of 1-bit data, and the R, G, B planes are encoded in accordance with any one of 4 encoding modes, which are suitable for the application of the encoded data.

Accordingly, an optimum encoding, suitable for the chracteristics of the image to be encoded and/or the function of the printer provided at the receiver, can be performed.

In the embodiment shown in FIG. 1, the encoding is performed for 3 planes representing a binary colour image. Any number of planes, however, may be encoded in the same manner as described above.

FIG. 17A shows another embodiment which separates the full colour image into, for example, 6-planes. The colour image input portion 20 outputs 8-bits R data 101, 8-bits G data 102 and 8-bits B data as described before. A quantizing portion 26 quantizes the R, G, B data and thereby outputs 2-bits of R data 104', 2-bits G data 105' and 2-bits B data 106'.

The encoding can be performed, by treating the 2-bits R, G, B data as six planes as discussed later. Namely, treating the MSB of the R data (R-MSB) as a first plane, the LSB of the R data (R-LSB) as a second plane, the MSB of the G data (G-MSB) as a third plane, the LSB of the G data (G-LSB) as a fourth plane, the MSB of the B data (B-MSB) as a fifth plane and the LSB of the B data (B-LSB) as a sixth plane, these six planes are encoded.

The 2-bits R, G, B data output from the quantizing portion are stored into an image storing portion 27. The image storing portion 27 has a storing capacity for 6-planes of image data. The image storing portion 27 reads out 6-planes of binary image data 107'A, 107'B, 108'A, 108'B, 109'A and 109'B.

Figure 17B:
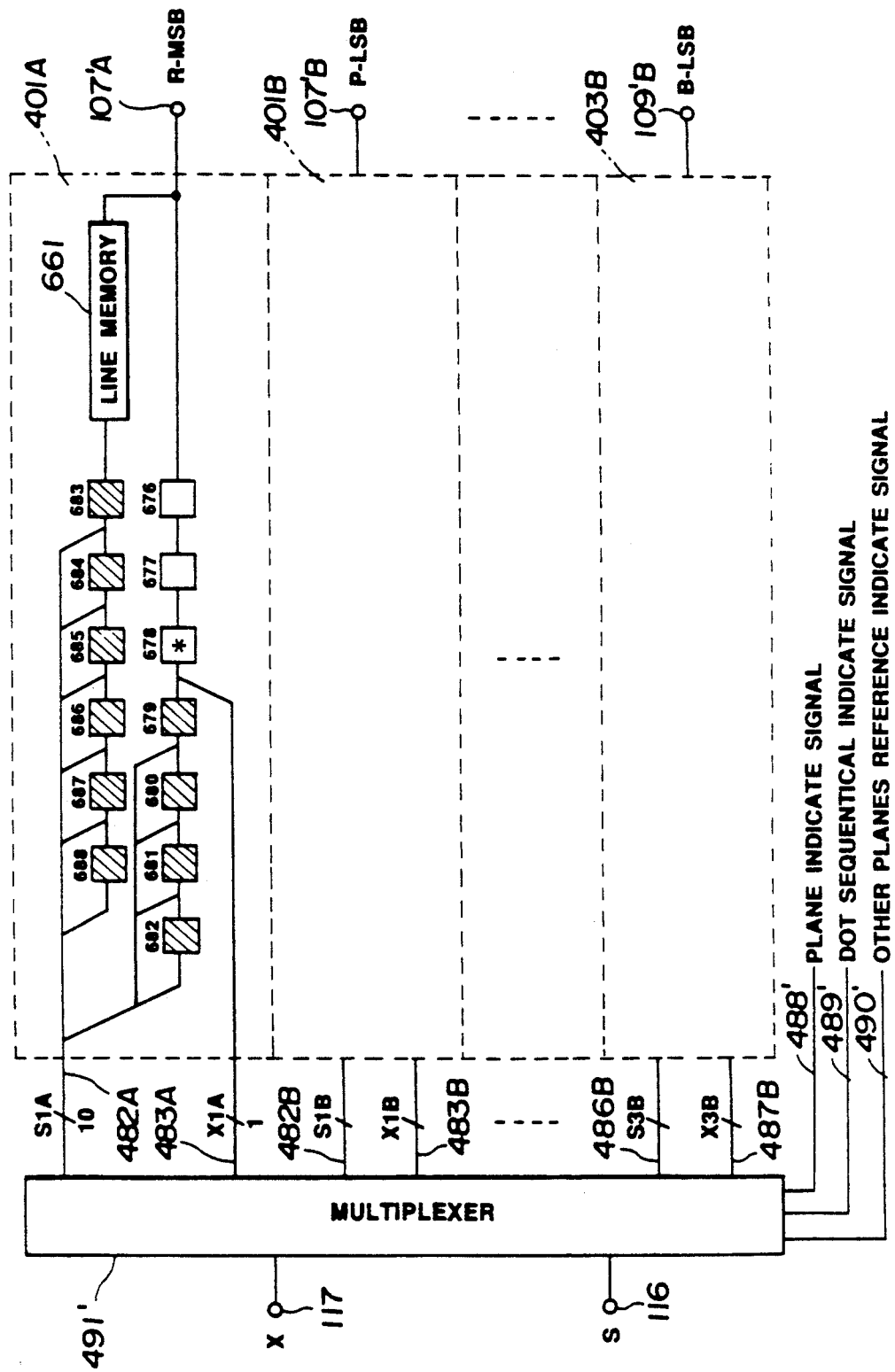
FIG. 17B is a block diagram of another prediction status determining portion.

The 6-planes of binary image data 107'A, 107'B, 108'A, 108'B, 109'A, 109'B are input to the prediction status determining portion (FIG. 17B).

In FIG. 17B, six planes of binary image data are inputted to six prediction status forming portions 401A, 401B, 402A, 402B, 403A and 403B, respectively. These portions are the same construction so the construction of the portion 401A which processes the binary image data R-MSB 107'A will be described.

Binary image data R-MSB 107'A is input into a line memory 661. Thereby two lines of binary image data can be supplied to group of latches 676–688 in a parallel manner and can be stored therein.

Binary image data R-MSB 107'A representing a line to be encoded is directly stored in the latches 676n682 in a raster order. Binary image data R-MSB representing a preceeding line is stored in the latch 683–688 via the line memory 661.

The latch 478 (marked with *) holds the binary image data of the pixel to be encoded and the latches 679n688 hold the binary image data of the 10 pixels already encoded at around the pixel to be encoded.

The status of the pixel to be encoded and the statuses of the 10 pixels around the pixel to be encoded are represented by the encoding pixel signal X483A and a status signal S482A, respectively and both signals are supplied to the multiplexer 491'.

At the multiplexer 491' encoding pixel signals X483B, X485A, X485B, X487A, 487B and status signals S482B, S484A, S484B, S486A, S486B concerning the binary image data R-LSB 107'B, G-MSB 108'A, G-LSB 108'B, B-MSB 109'A, B-LSB 109'B are also inputted from the prediction status forming portions 401B, 402A, 402B, 403A, 403B.

The multiplexer 491' multiplexes these input signals in accordance with the plane indicated signal 488', the dot sequential indicated signal 489' and the other planes reference signal 490', and generates the pixel signal X117 and the prediction status signal S116.

FIG. 17C shows the positions of the pixels to be referred to. When the N plane is encoded by referring to other planes, reference is made to 10 pixels around the pixel to be encoded on the N plane and 1 or 2 pixels at the same position on the N-1 plane or the N-2 plane as shown in FIG. 17C(B).

When other planes are not referred to, reference is made to only 10 pixels around the pixel to be encoded on the N plane as shown in FIG. 17C (B).

Figure 17D:
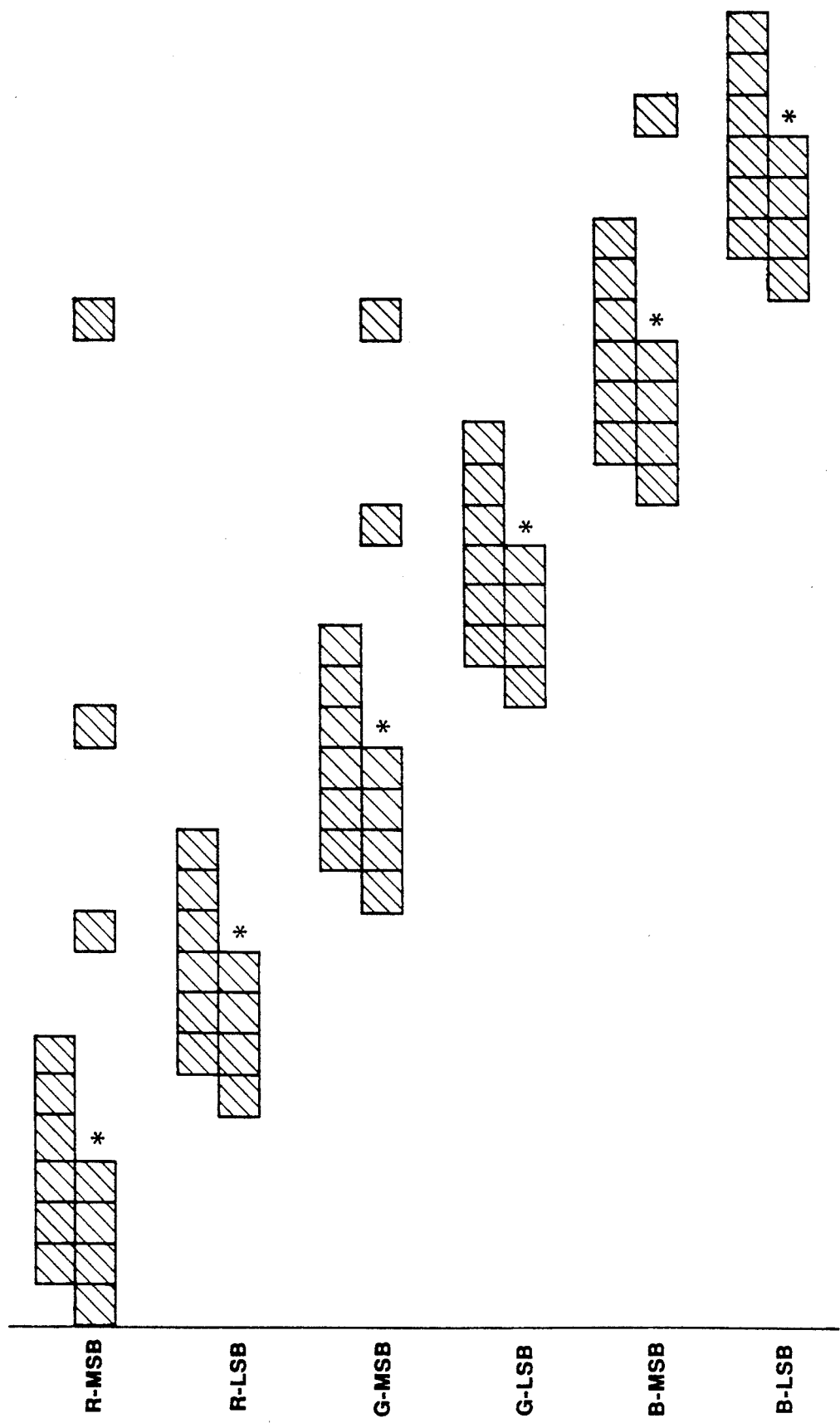
FIG. 17A is a block diagram of another embodiment of image encoding apparatus.
FIG. 17C (A) and (B), FIG. 17D are drawings to show the reference pixels.

FIG. 17D shows the position of reference pixels for each of six planes.

R, G, B multi-bit colour image data has a correlation between the colours and correlation between the planes.

FIG. 17D shows an example such that the encoding operation is carried out an order such as R-MSB R-LSB G-MSB G-LSB B-MSB B-LSB by referring to other planes a relatively strong correlation.

For example, when R-LSB is encoded, reference is made to 10 pixels around the pixel to be encoded and a pixel at the same position of R-MSB.

When G-MSB is encoded, reference is made to 10 pixels around the pixel to be encoded and a pixel at the same position of R-MSB.

Namely, the correlation between the colours in LSB is relatively weak, so LSB value of other colour is not referred.

When B-MSB is encoded, reference is made to 10 pixels around the pixel to be encoded and pixels at the same position of R-MSB and G-MSB already encoded.

On the other hand, when G-LSB is encoded, reference is made to 10 pixels around the pixel to be encoded and a pixel at the same position of G-MSB.

As described above, the optimum encoding mode suitable for the image to be encoded or the function of the receiver is selected in accordance with the dot sequential indicated signal 489' and the other plans reference signal 490'.

FIG. 17A shows an embodiment to process 2-bit, R, G, B data representing a colour image. The encoding process may be applied to not only a colour image but also a black and white image of, for example, 4-bits or 6-bits.

Namely, in case that a black and white image of 6-bits is encoded, the black and white image is separated into 6-bit planes and these 6-bit planes are inputted into the prediction status forming portions 401A, 401B, 402A, 402B, 403A and 404B, respectively.

Accordingly, the black and white image of 6-bits can be encoded dot sequentially or plane sequentially, by referring to other planes or without referring to other planes.

An example of the encoding operation will be explained.

The first plane (MSB) is encoded without referring to other planes, then the second plane is encoded with or without referring to a pixel at the same position of the pixel to be encoded on the first plane. The other planes are encoded in the same manner as the second plane.

Namely, when the planes other than the first plane are encoded, either encoding with reference to other planes or encoding without reference to other planes may be selected.

In general, there is a strong correlation between bit planes near the MSB and a weak correlation between bit planes near LSB. Accordingly, it is better that reference pixels are determined for every bit plane.

Figures 14, 18:
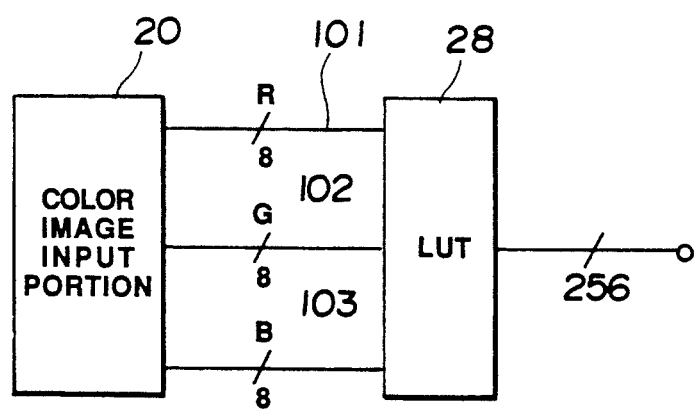
FIG. 14 is a table to show an output of the prediction conversion circuit.
FIG. 18 is a block diagram of another embodiment of image encoding apparatus.

FIG. 18 shows another embodiment according to the invention. The 8-bits R, G, B data 101, 102, 103 are input from the colour image input portion 20 to a look-up table (LUT) 28 for data conversion. The LUT28 converts the R, B, G data 101, 102, 103 into 256 colour signals with which an colour image is displayed on a colour monitor of, for example, a colour work station. These 256 colour signals are separated into 256 planes, and each of 256 planes is encoded in the same manner as described above.

In the case where the image is encoded by referring to other planes, reference is made to the plane representing a colour which is near to the colour of the plane to be encoded.

In the embodiment, dynamic arithmetic encoding was used for encoding but encoding can be made also by other predictive encoding which can perform both plane sequential encoding and dot sequential encoding.

In this embodiment, the encoding mode was manually set using the operation section but it can be automatically set in accordance with the detection of a characteristic of an image. For example, when it is recognized that a correlation between planes is relatively strong, the encoding mode may be automatically set so that the reference is made to other planes.

Further, by detecting the function of the printer of the receiver in a protocol, when it is detected that the printer is a serial printer, for example, the dot sequential encoding may be automatically set.

In case that the encoding is performed by referring to other planes, the reference may be made to not only the pixel at the same position but also the pixel at a different position from the pixel to be encoded when, for example, the colour image input portion scans an colour image with colour linear sensors arranged in zigzag.

ANOTHER EMBODIMENT

As explained above, any one of four encoding modes may be selected in response to the combination of the dot sequential indicated signal 489 (O-flag) and the other planes reference indicated signal 490 (R-flag). This selection is made in accordance with the function or ability of the receiver. The encoding efficiencies of each encoding mode for the same image are different from each other. Accordingly, in case that the receiver has a plurality of different functions or abilities each of which can decode the data encoded with mutually different encoding modes, it is better to use the encoding mode which can encode the image efficiently.

FIG. 19 shows a block diagram of an image encoding apparatus which encodes the image with two different encoding modes at the same time and selects the encoded data which is encoded efficiently so as to transmit the encoded data.

In FIG. 19, some blocks denoted by same numbers as that in FIG. 1 have the same functions as the blocks of FIG. 1. The blocks which are different from that of FIG. 1 will now be described.

In FIG. 19 there are two prediction status determining portions 23A, B and two dynamic arithmetic encoding portions 24A, B. The binary colour signals R107, G108 and B109 are input from the binary image storing portion 22 to both prediction status determining portions 23A and 23B. Each of the prediction status determining portions 23A and 23B has a construction as shown in FIG. 7. Accordingly, each of the prediction status determining portions 23A and 23B can operate with one of the above mentioned 4 modes in accordance with the combination of the O-flag and R-flag. The prediction status determining portions 23A and 23B can operate mutually different modes, respectively. Namely, two different encoding modes are performed at the same time.

The combinations of two encoding modes will be explained as follows:

(1) The dot sequential encoding with referring to other planes and the dot sequential encoding without referring to other planes.

At the prediction status determining portion 23A, the dot sequential indicated signal 489 is set to "1" the other planes reference signal 490 is set to "1". At the prediction status determining portion 23B, the dot sequential indicated signal 489 is set to "1" the other planes reference signal 490 is set to "0".

(2) The plane sequential encoding with referring to other planes and the plane sequential encoding without referring to other planes. At the portion 23A, the signal 489 is set to "o" and the signal 490 is set to "1".

At the portion 23B, the signal 489 is set to "0" and the signal 490 is set to "0".

(3) The dot sequential encoding with referring to other planes and the plane sequential encoding with referring other planes.

At the portion 23A, the signal 489 is set to "1" and the signal 490 is set to "1".

At the portion 23B, the signal 489 is set to "0" and the signal 490 is set to "1".

(4) The dot sequential encoding without referring other planes and the plane sequential encoding without referring other planes.

At the portion 23A, the signal 489 is set to "1" and the signal 490 is set to "0".

At the portion 23B, the signal 489 is set to "0" and the signal 490 is set to "0".

The encoding controlling portion 30 sets one of the four combinations in accordance with an actuation of any one of four keys 501–504 of the mode setting portion 32.

Figure 20:
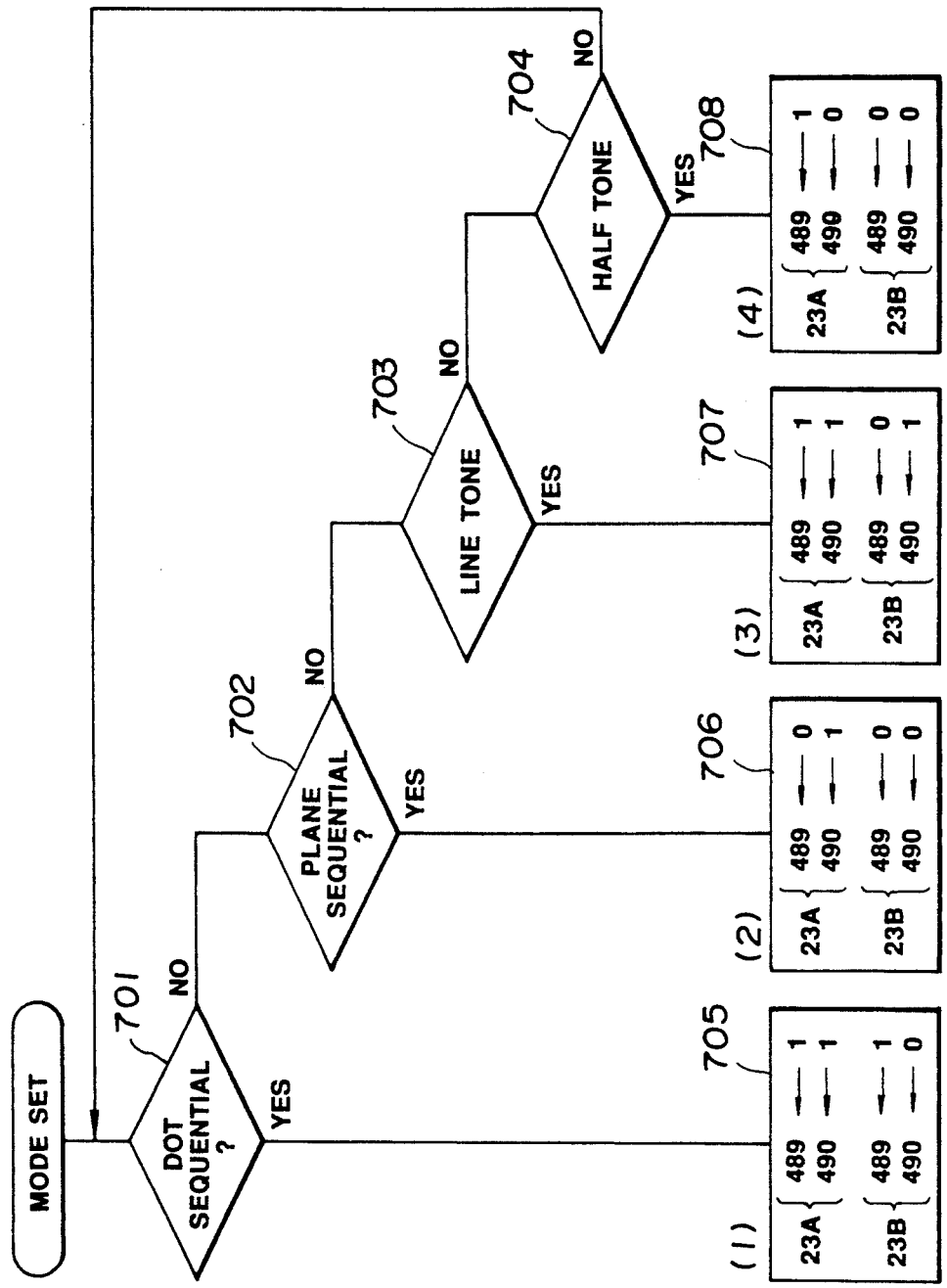
FIG. 20 is a flow chart of a mode setting operation.

FIG. 20 is a flow chart showing the setting procedure by the encoding controlling portion 30.

If the dot sequential encoding mode is selected by the actuation of the key 501, the encoding controlling portion 30 sets the dot sequential indicated signal 489 and the other planes reference signal 490 as described in (1). Thereby, the dot sequential encoding with referring to other planes and the dot sequential encoding without referring to other planes are performed at the same time (step 701, 705).

If the plane sequential encoding mode is selected by the actuation of the key 502, the dot sequential indicated signal 489 and the other planes reference signal 490 are set as described in (2). Thereby the plane sequential encoding with referring to other planes and the plane sequential encoding without referring other planes are performed at the same time (step 702, 706).

If the image to be encoded is indicated as a line tone image by the key 503, the dot sequential indicated signal 489 and the other planes reference signal 490 are set as described in (3). Thereby the dot sequential encoding with referring to other planes and the plane sequential encoding with referring to other planes are performed at the same time.

If the image to be encoded is indicated as a half tone image by the key 504, the dot sequential indicated signal 489 and the other planes reference signal 490 are set as described in (4). Thereby the dot sequential encoding without referring to other planes and the plane sequential encoding without referring to other planes are performed at the same time.

In this way the prediction status determining portions 23A nad 23B perform mutually different operations in accordance with the dot sequential indicated signal 489 and the other planes reference signal 490. The prediction status determining portions 23A and 23B generate pixel signal X117A, X117B and prediction status signal S116A, S116B respectively.

The dynamic arithmetic encoding portion 24A encodes the image on the basis of the pixel signal X117A and the prediction status signal S116A. The dynamic arithmetic encoding portion 24B encodes the image on the basis of the pixel signal X117B and the prediction status signal S116B.

Accordingly, the identical image is encoded with two different encoding modes at the same time. The construction of each of the dynamic arithmetic encoding portions 24A and 24B is similar to that of the dynamic arithmetic encoding portion 24 shown in FIG. 1.

The code data obtained by the dynamic arithmetic encoding portion 24A and 24B is supplied to the communication processing portion 31 via data line 118A and 118B, respectively.

Each of the code data is stored in internal memories 33A and 33B, provided in the communication processing portion 31.

The communication processing portion 31 makes a comparison of the amount of the encoded data stored in memory 33A and the amount of the encoded data stored in memory 33B and selects the encoded data of which the amount is smaller. Then the selected encoded data is transmitted via line 119.

On transmitting the encoded data, the O-flag and the R-flag representing the encoding mode of the selected encoded data must be set before the encoded data as shown in FIG. 2A.

As explained above, the construction of FIG. 19 increases the efficienty of an image encoding for transmitting or storing an image data.

In this embodiment, the principal encoding mode was manually set by using the mode setting portion, but it can be automatically set by detecting whether the printer is a dot sequential printer or a plane sequential printer in a protocol.

Moreover, the following two combinations of two encoding modes may be considered.

(5) The dot sequential encoding with referring to other planes and the plane sequential encoding without referring to other planes.

(6) The dot sequential encoding without referring to other planes and the plane sequential encoding with referring to other planes.

In this embodiment, the transmission of the encoded data was described, but the encoded data may be stored in, for example, an electronic filling machine.

Besides, two different encoding modes may be performed on a time share basis, by using an identical encoding circuit while encoding parameters are sequentially changed.

The present invention was explained above in reference to a few preferred embodiments, but needless to say, the present invention is not limited to these embodiments but various modification and changes are possible.

What is claimed is:

1. Image encoding apparatus comprising:
   first encoding means for encoding an image plane sequentially;
   second encoding means for encoding the image dot sequentially; and
   selection means for selecting one of said first and second encoding means to provide encoded data.

2. An apparatus according to claim 1, wherein said first and second encoding means encode a color image.

3. An apparatus according to claim 2, wherein the color image includes a plurality of image planes.

4. An apparatus according to claim 1, wherein said first and second encoding means encode a multi-bit image.

5. An apparatus according to claim 4, wherein the multi-bit image includes a plurality of bit planes.

6. An apparatus according to claim 1, wherein said selection means operates in response to a manual instruction.

7. An apparatus according to claim 1, wherein both said first and second encoding means encode the image to obtain the encoded data and wherein said selection means operates in accordance with an amount of the encoded data obtained by said first and second encoding means in encoding the image.

8. An apparatus according to claim 1, wherein said first and second encoding means encode the image in parallel.

9. Image encoding apparatus comprising:
   first encoding means for encoding an image having a plurality of planes by a method in which data of one plane is encoded with reference to other planes;
   second encoding means for encoding the image by a method in which data of one plane is encoded without reference to other planes; and
   selection means for selecting one of said first and second encoding means to provide encoded data.

10. An apparatus according to claim 9, wherein said first and second encoding means encode a color image.

11. An apparatus according to claim 9, wherein said first and second encoding means encode a multi-bit image.

12. An apparatus according to claim 9, wherein said first and second encoding means encode an image by predictive coding.

13. An apparatus according to claim 9, wherein said selection means operates in response to a manual instruction.

14. An apparatus according to claim 9, wherein said selection means operates in accordance with an amount of the encoded data obtained by said first and second encoding means.

15. An apparatus according to claim 9, wherein said first and second encoding means encode the image in parallel.

16. Image encoding method comprising:
a first encoding step of encoding an image plane sequentially;
a second encoding step of encoding the image dot sequentially; and
a selection step of selecting one of said first and second encoding steps to provide encoded data.

17. A method according to claim 16, wherein said first and second encoding steps encode a color image.

18. A method according to claim 17, wherein the color image includes a plurality of image planes.

19. A method according to claim 16, wherein said first and second encoding steps encode a multi-bit image.

20. A method according to claim 19, wherein the multi-bit image includes a plurality of bit planes.

21. A method according to claim 16, wherein said selection step operates in response to a manual instruction.

22. A method according to claim 16, wherein both said first and second encoding steps encode the image to obtain the encoded data and wherein said selection step operates in accordance with an amount of the encoded data obtained by said first and second encoding steps in encoding the image.

23. A method according to claim 16, wherein said first and second encoding steps encode the image in parallel.

24. Image encoding method comprising:
a first encoding step of encoding an image having a plurality of planes by a method in which data of one plane is encoded with reference to other planes;
a second encoding step of encoding the image by a method in which data of one plane is encoded without reference to other planes; and
a selection step of selecting one of said first and second encoding steps to provide encoded data.

25. A method according to claim 24, wherein said first and second encoding steps encode a color image.

26. A method according to claim 24, wherein said first and second encoding steps encode a multi-bit image.

27. A method according to claim 24, wherein said first and second encoding steps encode an image by predictive coding.

28. A method according to claim 24, wherein said selection step operates in response to a manual instruction.

29. A method according to claim 24, wherein said selection step operates in accordance with an amount of the encoded data obtained by said first and second encoding steps.

30. A method according to claim 24, wherein said first and second encoding steps encode the image in parallel.

* * * * *

UNITED STATES PATENT AND TRADEMARK OFFICE
CERTIFICATE OF CORRECTION

PATENT NO. : 5,317,411
DATED : May 31, 1994
INVENTOR(S) : TADASHI YOSHIDA

Page 1 of 5

It is certified that error appears in the above-identified patent and that said Letters Patent is hereby corrected as shown below:

ON TITLE PAGE

In [57] Abstract:
Line 3: "may" should read --can--.
Line 4, "selects" should read --select--.

IN THE DRAWINGS

Sheet 8 of 22, "SEQUENTICAL" should read --SEQUENTIAL-- and "INDICATE" (both occurrences) should read --INDICATED--.
Sheet 12 of 22, "SUBTRACTOR" should read --SUBTRACTER-- and "REGISTOR" should read --REGISTER--.
Sheet 18 of 22, "SEQUENTICAL" should read --SEQUENTIAL-- and "INDICATE" (both occurrences) should read --INDICATED--.

COLUMN 1

Line 21, "is" should be deleted.

COLUMN 3

Line 8, "FIG. 3 is" should read --FIGS. 3(a) and 3(b) are--.
Line 33, "(B)," should read --(B) and--.

COLUMN 4

Line 19, "status 1 or 0)" should read --status (1 or 0)--.
Line 48, "represent" should read --represents--.
Line 49, "20" should read --202-- and "represent" should read --represents--.

UNITED STATES PATENT AND TRADEMARK OFFICE
CERTIFICATE OF CORRECTION

PATENT NO. : 5,317,411
DATED      : May 31, 1994
INVENTOR(S): TADASHI YOSHIDA

It is certified that error appears in the above-identified patent and that said Letters Patent is hereby corrected as shown below:

COLUMN 5

Line 23, "O-flg," should read --O-flag,--.
    Line 51, "FIG. 3 shows" should read --FIGS. 3(a) and
             3(b) show--.
    Line 58, "FIG. 3(A)," should read --FIG. 3(a),--.
    Line 61, "show" should read --shows--.
    Line 68, "3(B)," should read --3(b),--.

COLUMN 6

Line 22, "FIG. 3(A)" should read --FIG. 3(a)--.
    Line 24, "FIG. 3(B)" should read --FIG. 3(b)--.
    Line 65, "FIG. 3(B)." should read --FIG. 3(b).--.

COLUMN 7

Line 36, "he" should read --the--.
    Line 46, "order." should read --order:--.
    Line 51, "preform" should read --perform--.
    Line 67, "signal 107," should read --signal R107,--.

COLUMN 8

Line 4,  "memory 76" should read --memory 476--.
    Line 8,  "at" should read --that--.
    Line 32, "references indicate" should read
             --reference indicated--.
    Line 39, "n" should read --in-- and
             "FIG. 3(B)" should read --FIG. 3(b)--.

UNITED STATES PATENT AND TRADEMARK OFFICE
CERTIFICATE OF CORRECTION

PATENT NO. : 5,317,411
DATED : May 31, 1994
INVENTOR(S) : TADASHI YOSHIDA

Page 3 of 5

It is certified that error appears in the above-identified patent and that said Letters Patent is hereby corrected as shown below:

COLUMN 8

Line 44, "FIG. 3(A)" should read --FIG. 3(a)--.
    Line 52, "referred" should read --referred to--.
    Line 53, "indicate" should read --indicated--.
    Line 54, "referred" should read --referred to--.
    Line 63, "signal x117" should read --signal x 117--.

COLUMN 9

Line 31, "LP: 1" should read --(LPS: 1--.

COLUMN 10

Line 62, "circuit 37" should read --circuit 87--.
    Line 63, "signals 319" should read --signal 319--.

COLUMN 11

Line 9, ".the" should read --the--.
    Line 17, "Ex" should read --EX--.
    Line 23, "tractor" should read --tracter--.
    Line 52, "vlaues" should read --values--.
    Line 68, "Pei" should be deleted.

COLUMN 12

Line 64, "tractor 94," should read --tracter 94,--.

UNITED STATES PATENT AND TRADEMARK OFFICE
CERTIFICATE OF CORRECTION

PATENT NO. : 5,317,411

DATED : May 31, 1994

INVENTOR(S) : TADASHI YOSHIDA

It is certified that error appears in the above-identified patent and that said Letters Patent is hereby corrected as shown below:

COLUMN 13

Line 2, "unitl" should read --until--.
Line 31, "chracteristics" should read --characteristics--.

COLUMN 14

Line 6, "676n682" should read --676-682--.
Line 11, "679n688" should read --679-688--.
Line 13, "at" should be deleted.
Line 31, "FIG. 17C" should read --FIGS. 17C(A) and 17C(B)--.
Line 36, "FIG. 17C(B)." should read --FIG. 17C(A)--.
Line 46, "an" should read --in an--.
Line 48, "a" should read --having a--.
Line 54, "R-MSB" should read --G-MSB--.
Line 67, "plans" should read --planes--.

COLUMN 16

Line 48, "planes. At" should read --planes. ¶ At--.
Line 49, ""o"" should read --"0"--.

COLUMN 17

Line 35, "nad" should read --and--.

UNITED STATES PATENT AND TRADEMARK OFFICE
CERTIFICATE OF CORRECTION

PATENT NO. : 5,317,411
DATED : May 31, 1994
INVENTOR(S) : TADASHI YOSHIDA

It is certified that error appears in the above-identified patent and that said Letters Patent is hereby corrected as shown below:

<u>COLUMN 18</u>

Line 19, "filling" should read --filing--.

Signed and Sealed this

Fifteenth Day of November, 1994

Attest:

BRUCE LEHMAN

*Attesting Officer*  *Commissioner of Patents and Trademarks*